(12) United States Patent
Sakurai et al.

(10) Patent No.: US 10,080,247 B2
(45) Date of Patent: Sep. 18, 2018

(54) BASE STATION, TERMINAL, AND COMMUNICATION METHOD

(71) Applicant: Panasonic Corporation, Osaka (JP)

(72) Inventors: Toshiaki Sakurai, Kanagawa (JP); Takayuki Sotoyama, Kanagawa (JP)

(73) Assignee: PANASONIC CORPORATION, Osaka (JP)

( * ) Notice: Subject to any disclaimer, the term of this patent is extended or adjusted under 35 U.S.C. 154(b) by 45 days.

(21) Appl. No.: 15/126,126

(22) PCT Filed: May 30, 2014

(86) PCT No.: PCT/JP2014/002877
§ 371 (c)(1),
(2) Date: Sep. 14, 2016

(87) PCT Pub. No.: WO2015/140839
PCT Pub. Date: Sep. 24, 2015

(65) Prior Publication Data
US 2017/0099696 A1   Apr. 6, 2017

(30) Foreign Application Priority Data

Mar. 20, 2014   (JP) .................................. 2014-058089

(51) Int. Cl.
*H04W 16/32* (2009.01)
*H04W 76/04* (2009.01)
(Continued)

(52) U.S. Cl.
CPC ......... *H04W 76/045* (2013.01); *H04W 16/32* (2013.01); *H04W 64/003* (2013.01); *H04W 76/25* (2018.02); *H04W 36/04* (2013.01)

(58) Field of Classification Search
None
See application file for complete search history.

(56) References Cited

U.S. PATENT DOCUMENTS

2015/0382260 A1* 12/2015 Van Phan ............. H04W 36/04
  455/436
2016/0337916 A1* 11/2016 Deenoo ................... H04W 8/22
(Continued)

OTHER PUBLICATIONS

3GPP TR 36.842 V12.0.0, $3^{rd}$ Generation Partnership Project; Technical Specification Group Radio Access Network, Study on Small Cell enhancements for E-UTRA and E-UTRAN; Higher layer aspects (Release 12), Dec. 2013, 71 pages.
(Continued)

*Primary Examiner* — Hicham Foud
(74) *Attorney, Agent, or Firm* — Seed IP Law Group LLP

(57) ABSTRACT

Even when a terminal goes out of a macro cell, data communication in the small cell can be caused to continue while the mobile management in a macro cell is continued. When a first determination unit (205) determines that a terminal exists outside the cell of a base station (200), an existence recognition packet transmission/reception unit (207) transmits a recognition packet, which is used for recognition, to the terminal via a small cell, and thereafter receives a response to the recognition packet from the terminal via the small cell. When a second determination unit (206) determines, because of the reception of the response, that the terminal exits inside the cell of the base station (200), a radio resource control unit (204) causes the connection of the control plane between the terminal and the base station (200) to continue.

7 Claims, 13 Drawing Sheets

(51) Int. Cl.
*H04W 64/00* (2009.01)
*H04W 76/25* (2018.01)
*H04W 36/04* (2009.01)

(56) References Cited

U.S. PATENT DOCUMENTS

2017/0105162 A1* 4/2017 Kim et al. ............ H04W 36/38
2017/0164222 A1* 6/2017 Nagata .................. H04W 48/16

OTHER PUBLICATIONS

International Search Report dated Aug. 12, 2014, for corresponding International Application No. PCT/JP2014/002877, 4 pages.

* cited by examiner

BASE STATION, TERMINAL, AND COMMUNICATION METHOD

TECHNICAL FIELD

The present invention relates to a base station, a terminal and a communication method.

BACKGROUND ART

"LTE-Advanced," which is an evolved version of Long Term Evolution (LTE), is currently under study in 3GPP. In LTE-Advanced, a heterogeneous network (HetNet) is under study as a technique for improving the frequency utilization efficiency or the like. The heterogeneous network disposes a cell (small cell) which is a base station having low transmission power such as a pico cell or femt cell in a macro cell in addition to a cell arrangement centered on the macro cell which is a conventional base station having high transmission power.

LTE-Advanced is proposing to separate, in a system constituting a heterogeneous network, a C-Plane (also referred to as "control plane") from a U-Plane (also referred to as "data plane" or "user plane") (hereinafter, referred to as "C/U separation") (e.g., see Non-Patent Literature (hereinafter, simply referred to as "NPL") 1). More specifically, during C/U separation, the macro cell performs movement management using the control plane to maintain connectivity and the small cell handles only the user plane using a wideband to thereby provide high throughput.

Furthermore, when the user operating environment is taken into consideration, it is expected that small cells are more likely to be arranged indoors. On the other hand, macro cells are expected to maintain connectivity in a wide range under the control of control planes. Thus, indoors where a small cell is disposed, there can be a situation where while a terminal (which may also be referred to as "UE") can receive a user plane favorably, the terminal cannot receive a control plane. That is, there can be a situation where although it is possible to perform communication using a user plane, it is possible neither to perform communication using a control plane nor to maintain connectivity.

In contrast, NPL 1 discloses that both of a macro cell and a small cell include a control plane control section (RRC: radio resource control) and when it is not possible to maintain connectivity by the macro cell, the small cell transmits a control plane message to a terminal to thereby maintain connectivity. That is, the terminal continues communication even when it is outside a service area of the macro cell if it is located within the service area of the small cell and determines to be outside the communication range when links with both the macro cell and the small cell are outside the service areas.

CITATION LIST

Non-Patent Literature

NPL 1
3GPP TR 36.842 V12.0.0 (2013-12), Study on Small Cell enhancements for E-UTRA and E-UTRAN, Higher layer Aspects

SUMMARY OF INVENTION

Technical Problem

However, in consideration of the fact that the small cell handles only a user plane as in the aforementioned case of C/U separation, it may be possible to introduce low-priced devices dedicated to data transmission/reception as a small cell. In this case, the small cell is not provided with any control plane control section that processes a control plane message as in the case of NPL 1. Thus, when it is not possible to perform communication using a control plane between the macro cell and the terminal during C/U separation, even if communication using a user plane between the small cell and the terminal is possible, the terminal cannot receive the control plane.

Furthermore, when communication between the macro cell and the terminal using the control plane is not possible within the same radio system, traditional handover to the small cell may be performed to shift to communication without C/U separation. However, when the aforementioned small cell dedicated to data transmission/reception is introduced, handover to the small cell is not possible.

In the future, it is expected that the macro cell and the small cell constituting different radio systems; for example, a macro cell may constitute an LTE-Advanced system and a small cell may constitute another system such as WiFi/WiGig. However, during C/U separation, when communication between macro cell and the terminal using a control plane is possible, handover processing becomes necessary between different radio systems, causing the processing to become complicated.

Thus, when the terminal is located outside the service area of the macro cell during C/U separation, there is a problem that the processing for continuing data communication while continuing movement management becomes more difficult or more complicated.

An object of the present invention is to provide a base station, a terminal and a communication method capable of continuing, even when a terminal is located outside the service area of a macro cell, movement management in the macro cell and continuing data communication in a small cell in a heterogeneous network in which a macro cell performs movement management using a control plane and a small cell handles a user plane.

Solution to Problem

A base station according to an aspect of the present invention is a base station in a macro cell that performs communication using a control plane in a communication system in which the macro cell performs communication using the control plane and a small cell performs communication using a user plane with respect to a terminal, the base station including: a first determining section that determines, when there is no response to data of the control plane transmitted to the terminal, that the terminal is located outside a service area of the base station; a transmitting and receiving section that transmits, when the first determining section determines that the terminal is located outside the service area of the base station, a confirmation packet that confirms connection between the terminal and the small cell as data of the user plane to the terminal via the small cell and receives a response to the confirmation packet as the data of the user plane from the terminal via the small cell; a second determining section that assumes, upon receiving the response, that the terminal is located inside the service area of the base station; and a control section that causes, when the second determining section assumes that the terminal is located inside the service area of the base station, the connection of the control plane between the terminal and the base station to continue.

A terminal according to an aspect of the present invention is a terminal in a communication system in which a macro cell performs communication using a control plane and a small cell performs communication using a user plane with respect to the terminal, the terminal including: a first determining section that determines, when a reception level of a signal transmitted from the macro cell is less than a predetermined threshold, that the terminal is located outside a service area of the macro cell; a transmitting and receiving section that transmits, when the first determining section determines that the terminal is located outside the service area of the macro cell, a confirmation packet that confirms connection between the terminal and the small cell as data of the user plane to the macro cell via the small cell and receives a response to the confirmation packet as the data of the user plane from the macro cell via the small cell; a second determining section that assumes, upon receiving the response, that the terminal is located inside the service area of the macro cell; and a control section that causes, when the second determining section assumes that the terminal is located inside the service area of the macro cell, the connection of the control plane between the terminal and the macro cell to continue.

A communication method according to an aspect of the present invention is a communication method in a base station in a macro cell that performs communication using a control plane in a communication system in which the macro cell performs communication using the control plane and a small cell performs communication using a user plane with respect to a terminal, the method including: a first determining step of determining, when there is no response to data of the control plane transmitted to the terminal, that the terminal is located outside a service area of the base station; a transmitting and receiving step of transmitting, when the first determining step determines that the terminal is located outside the service area of the base station, a confirmation packet that confirms connection between the terminal and the small cell as data of the user plane to the terminal via the small cell and receiving a response to the confirmation packet as the data of the user plane from the terminal via the small cell; a second determining step of assuming, upon receiving the response, that the terminal is located inside the service area of the base station; and a controlling step of causing, when the second determining section assumes that the terminal is located inside the service area of the base station, the connection of the control plane between the terminal and the base station to continue.

A communication method according to an aspect of the present invention is a communication method in a terminal in a communication system in which a macro cell performs communication using a control plane and a small cell performs communication using a user plane with respect to the terminal, the method including: a first determining step of determining, when a reception level of a signal transmitted from the macro cell is less than a predetermined threshold, that the terminal is located outside a service area of the macro cell; a transmitting and receiving step of transmitting, when the first determining step determines that the terminal is located outside the service area of the base station, a confirmation packet that confirms connection between the terminal and the small cell as data of the user plane to the terminal via the small cell and receiving a response to the confirmation packet as the data of the user plane from the terminal via the small cell; a second determining step of assuming, upon receiving the response, that the terminal is located inside the service area of the macro cell; and a controlling step of causing, when the second determining step assumes that the terminal is located inside the service area of the macro cell, the connection of the control plane between the terminal and the macro cell to continue.

Advantageous Effects of Invention

According to the present invention, in a heterogeneous network in which a macro cell performs movement management using a control plane and a small cell handles a user plane, it is possible to continue, even when the terminal is located outside the service area of the macro cell, movement management in the macro cell and continue data communication in the small cell.

DESCRIPTION OF EMBODIMENTS

Hereinafter, embodiments of the present invention will be described in detail with reference to the accompanying drawings.

Embodiment 1

[Overview of Communication System]

Figure 1:
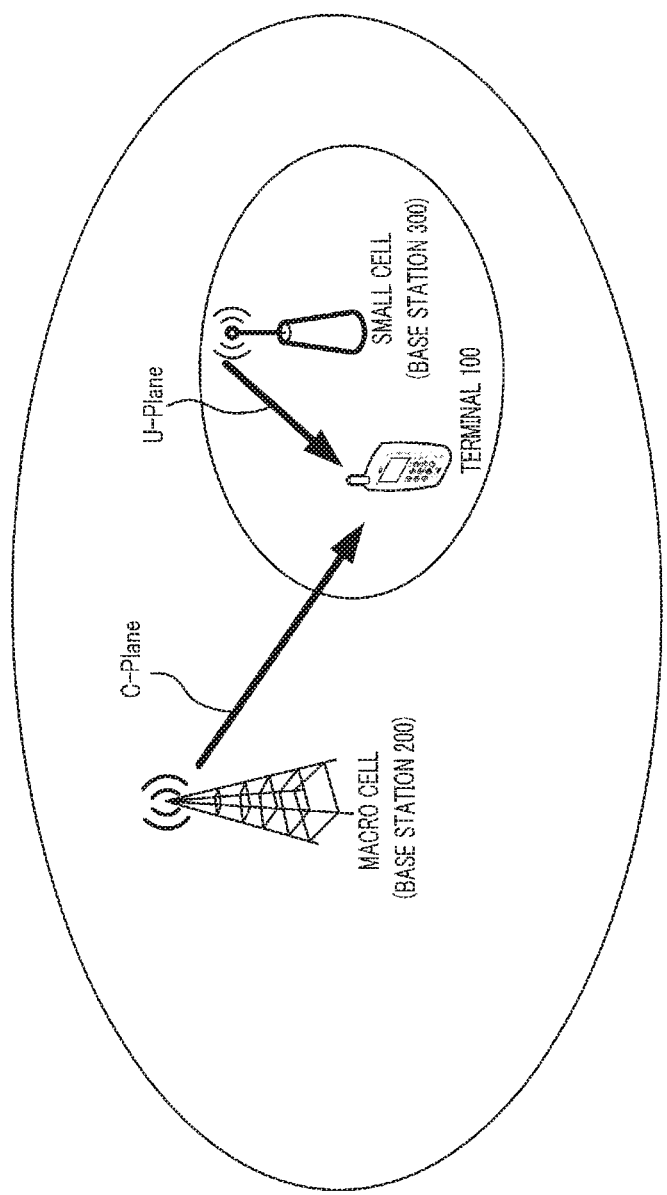
FIG. 1 is a diagram illustrating a configuration example of a communication system according to Embodiment 1 of the present invention.

A communication system according to the present embodiment includes, as shown in FIG. 1, terminal 100, base station 200 in a macro cell and base station 300 in a small cell. In the communication system, the macro cell controls a control plane (C-plane) to perform movement management and the small cell handles only a user plane (U-plane). That is, C/U separation is applied to the communication system shown in FIG. 1, in which base station 200 performs communication with terminal 100 using the control plane and base station 300 performs communication using the user plane.

A case will be described below where a radio system of the macro cell (base station 200) (hereinafter referred to as "first radio communication system") is different from a radio system of the small cell (base station 300) (hereinafter referred to as "second radio communication system"). For example, the macro cell supports an LTE-Advanced system and the small cell supports a radio system such as WiFi/WiGig. Terminal 100 adopts a configuration communicable in both the radio system of the macro cell and the radio system of the small cell.

Note that, the present embodiment is suitable for not only a case where the radio system of the macro cell is different from the radio system of the small cell in the communication system shown in FIG. 1 but also a case where the radio system of the macro cell is the same as the radio system of the small cell and the small cell is a base station that can communicate using only the user plane, for example.

[Configuration of Terminal 100]

Figure 2:
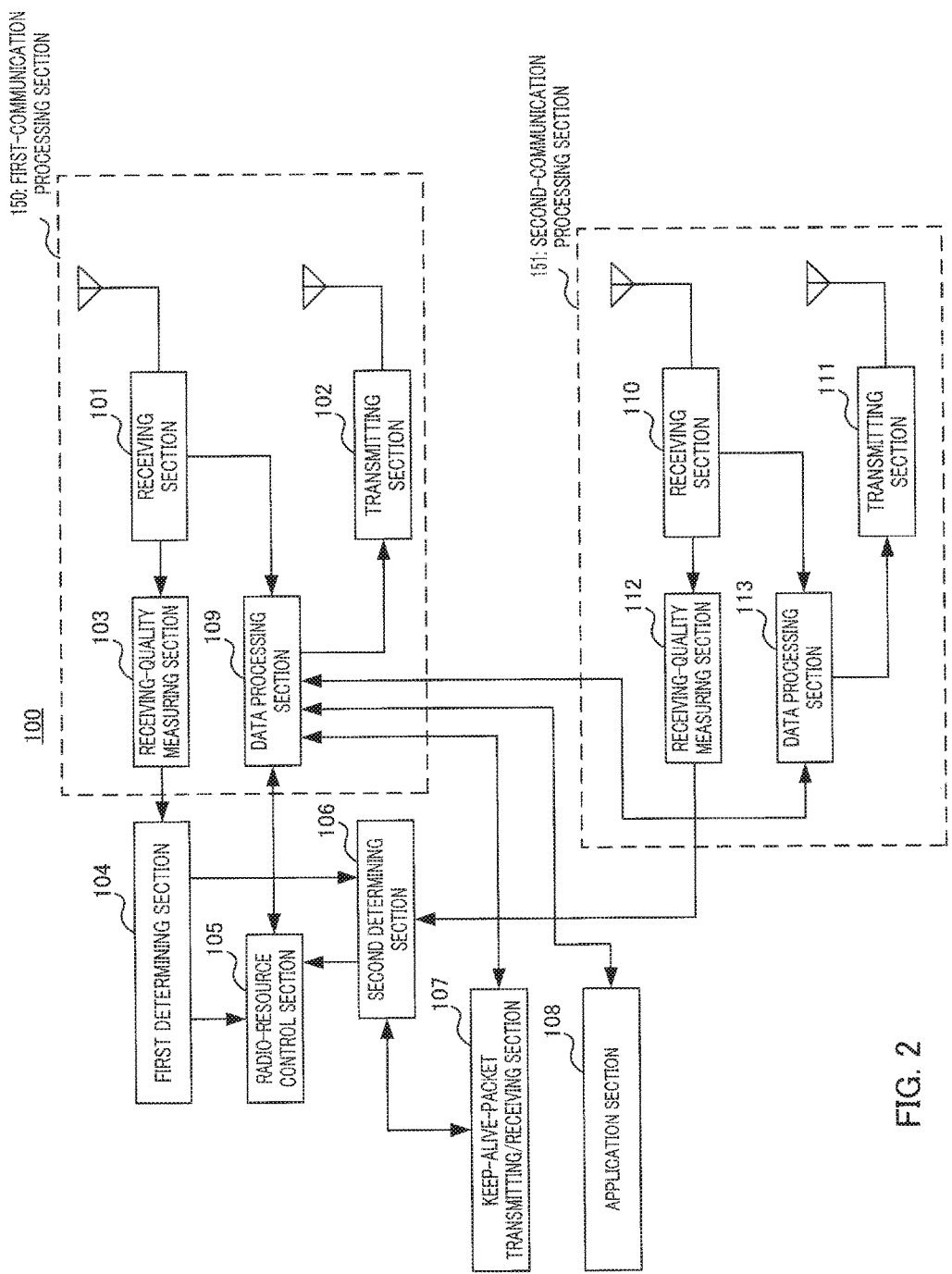
FIG. 2 is a block diagram illustrating a configuration of a terminal according to Embodiment 1 of the present invention.

FIG. 2 is a block diagram illustrating a configuration of terminal 100 according to the present embodiment. In FIG. 2, terminal 100 includes receiving section 101, transmitting section 102, receiving-quality measuring section 103, first determining section 104, radio-resource control section 105, second determining section 106, keep-alive-packet transmitting/receiving section 107, application section 108, data processing section 109, receiving section 110, transmitting section 111, receiving-quality measuring section 112 and data processing section 113.

In terminal 100, receiving section 101, receiving-quality measuring section 103, data processing section 109 and transmitting section 102 constitute first-communication processing section 150 corresponding to a first radio system identical to that of the macro cell. On the other hand, receiving section 110, receiving-quality measuring section 112, data processing section 113 and transmitting section 111 constitute second-communication processing section 151 corresponding to a second radio system identical to that of the small cell (that is, different from the macro cell).

Receiving section 101 demodulates a received signal received via an antenna and restores the signal. Examples of the received signal include a data signal and a reference signal transmitted from base station 200 (macro cell). During C/U separation, the received signal includes only control plane related data (control plane data). Receiving section 101 outputs the data signal or reference signal to receiving-quality measuring section 103 and data processing section 109.

Transmitting section 102 modulates a signal received from data processing section 109 and transmits the modulated signal via an antenna. For example, during C/U separation, the transmission signal includes only control plane data.

Receiving-quality measuring section 103 measures receiving quality (e.g., reception level) of a signal transmitted from base station 200 using a reference signal received from receiving section 101 and outputs a receiving-quality measured value to first determining section 104. Receiving-quality measuring section 103 may also measure an error rate (e.g., rate of occurrence of NG in CRC) of received data (restored information) as the receiving-quality measured value.

First determining section 104 determines whether or not terminal 100 is located in a service area of the cell (e.g., base station 200 which is a macro cell) currently being measured based on the receiving-quality measured value received from receiving-quality measuring section 103. For example, when the reception level of a signal transmitted from base station 200 is less than a predetermined threshold, first determining section 104 determines that terminal 100 is located outside the service area of base station 200. First determining section 104 outputs the determination result (inside or outside the service area) to radio-resource control section 105 and second determining section 106.

Radio-resource control section 105 controls establishment of a connection of radio resources between terminal 100 and base station 200 (macro cell) or base station 300 (small cell) based on the control plane data received from data processing section 109 and the determination result received from first determining section 104. Radio-resource control section 105 outputs the control plane data including control information on the connection establishment to data processing section 109. For example, when the determination result from first determining section 104 shows that the terminal is located inside the service area, radio-resource control section 105 continues the connection with the cell as the determination target and cuts the connection with the determination target cell when the terminal is located outside the service area.

During C/U separation, when the determination result on base station 200 (macro cell) received from first determining section 104 shows that the terminal is outside the service area, radio-resource control section 105 controls establishment of a connection of radio resources with the macro cell based on the determination result (re-determination result) received from second determining section 106. More specifically, when the determination result received from second determining section 106 shows that the terminal is inside the service area, radio-resource control section 105 continues the connection with the macro cell (base station 200) and cuts the connection with the macro cell when the terminal is outside the service area.

During C/U separation, second determining section 106 determines whether or not terminal 100 is located inside the service area of the small cell (base station 300) based on the receiving-quality measured value (receiving quality of signal transmitted from the small cell) received from receiving-quality measuring section 112 of second-communication processing section 151. Furthermore, second determining section 106 receives the determination result (inside or outside the service area) on the macro cell from first determining section 104.

When terminal 100 is located outside the service area of the macro cell and terminal 100 is inside the service area of the small cell, second determining section 106 requests keep-alive-packet transmitting/receiving section 107 to transmit a keep-alive packet. Upon receiving a notice that a response (ACK) to the requested keep-alive packet has been received from keep-alive-packet transmitting/receiving section 107, second determining section 106 determines that terminal 100 is inside the service area of the macro cell. On the other hand, upon receiving a notice that no response to the requested keep-alive packet has been received for a predetermined period from keep-alive-packet transmitting/receiving section 107, second determining section 106 determines that terminal 100 is outside the service area of the macro cell. That is, upon receiving a response to the keep-alive packet, although second determining section 106 determines, based on the receiving quality, that terminal 100 is outside the service area of the macro cell, second determining section 106 assumes that terminal 100 is located inside the service area of the macro cell. Second determining section 106 outputs the determination result (re-determination result) to radio-resource control section 105.

Keep-alive-packet transmitting/receiving section 107 generates a keep-alive packet at the request from second determining section 106 and outputs the keep-alive packet to data processing section 109. The keep-alive packet is a packet to confirm a connection between terminal 100 and the small cell, and is transmitted to the macro cell (base station 200) via the small cell (base station 300) as user plane-related data (user plane data). That is, when first determining section 104 determines that terminal 100 is located outside the service area of the macro cell, keep-alive-packet transmitting/receiving section 107 transmits a keep-alive packet that confirms the connection between terminal 100 and the small cell to the macro cell via the small cell as user plane data. While a response to the keep-alive packet is returned from base station 200, keep-alive-packet transmitting/receiving section 107 may, for example, periodically transmit keep-alive packets.

Keep-alive-packet transmitting/receiving section 107 receives a response (ACK) to the keep-alive packet transmitted to the macro cell from macro cell (base station 200) via the small cell (base station 300) as user plane data. Keep-alive-packet transmitting/receiving section 107 confirms whether or not a response (ACK) to the transmitted keep-alive packet is received and outputs the confirmation result (the presence or absence of a response) to second determining section 106.

Upon receiving the keep-alive packet transmitted from the macro cell from data processing section 109, keep-alive-packet transmitting/receiving section 107 generates a response (ACK) to the keep-alive packet and outputs the response to the keep-alive packet to data processing section 109. The response to the keep-alive packet is transmitted to the macro cell via the small cell as user plane data.

Application section 108 processes normal application data (user plane data). Application section 108 processes a signal (keep-alive packet or response to the keep-alive packet) received from keep-alive-packet transmitting/receiving section 107 via data processing section 109 in the same way as normal application data and outputs the processed data (user plane data) to data processing section 109. Application section 108 processes a signal (keep-alive packet or response to the keep-alive packet) received by data processing section 109 from the macro cell or the small cell in a manner similar to that of normal application data, and outputs the processed data to keep-alive-packet transmitting/receiving section 107 via data processing section 109.

Data processing section 109 outputs the control plane data out of the information received from receiving section 101 or data processing section 113 to radio-resource control section 105 and outputs the user plane data to application section 108. Furthermore, data processing section 109 multiplexes the control plane data received from radio-resource control section 105 and the user plane data received from application section 108 and outputs the multiplexed signal to transmitting section 102.

During C/U separation, data processing section 109 outputs the user plane data received from application section 108 to data processing section 113 of second-communication processing section 151 and outputs the user plane data received from data processing section 113 to application section 108. During C/U separation, data processing section 109 outputs the control plane data received from radio-resource control section 105 to transmitting section 102 and outputs the control plane data received from receiving section 101 to radio-resource control section 105.

Receiving section 110 demodulates a received signal received via an antenna and restores the signal. Examples of the received signal include a data signal and a reference signal transmitted from base station 300 (small cell). During C/U separation, the received signal includes only the user plane data. Receiving section 110 outputs the data signal or reference signal to receiving-quality measuring section 112 and data processing section 113.

Transmitting section 111 modulates a signal received from data processing section 113 and transmits the modulated signal via an antenna. For example, during C/U separation, the transmission signal includes only user plane data.

As in the case of receiving-quality measuring section 103, receiving-quality measuring section 112 measures receiving quality (e.g., reception level) of a signal transmitted from base station 300 using a reference signal received from receiving section 110 and outputs the receiving-quality measured value to second determining section 106.

Data processing section 113 outputs the signal received from receiving section 110 to data processing section 109. Data processing section 113 outputs the signal received from data processing section 109 to transmitting section 111. For example, during C/U separation, data processing section 113 outputs the user plane data received from data processing section 109 to transmitting section 111 and outputs the user plane data received from receiving section 110 to data processing section 109.

[Configurations of Base Station 200 and Base Station 300]

Figure 3:
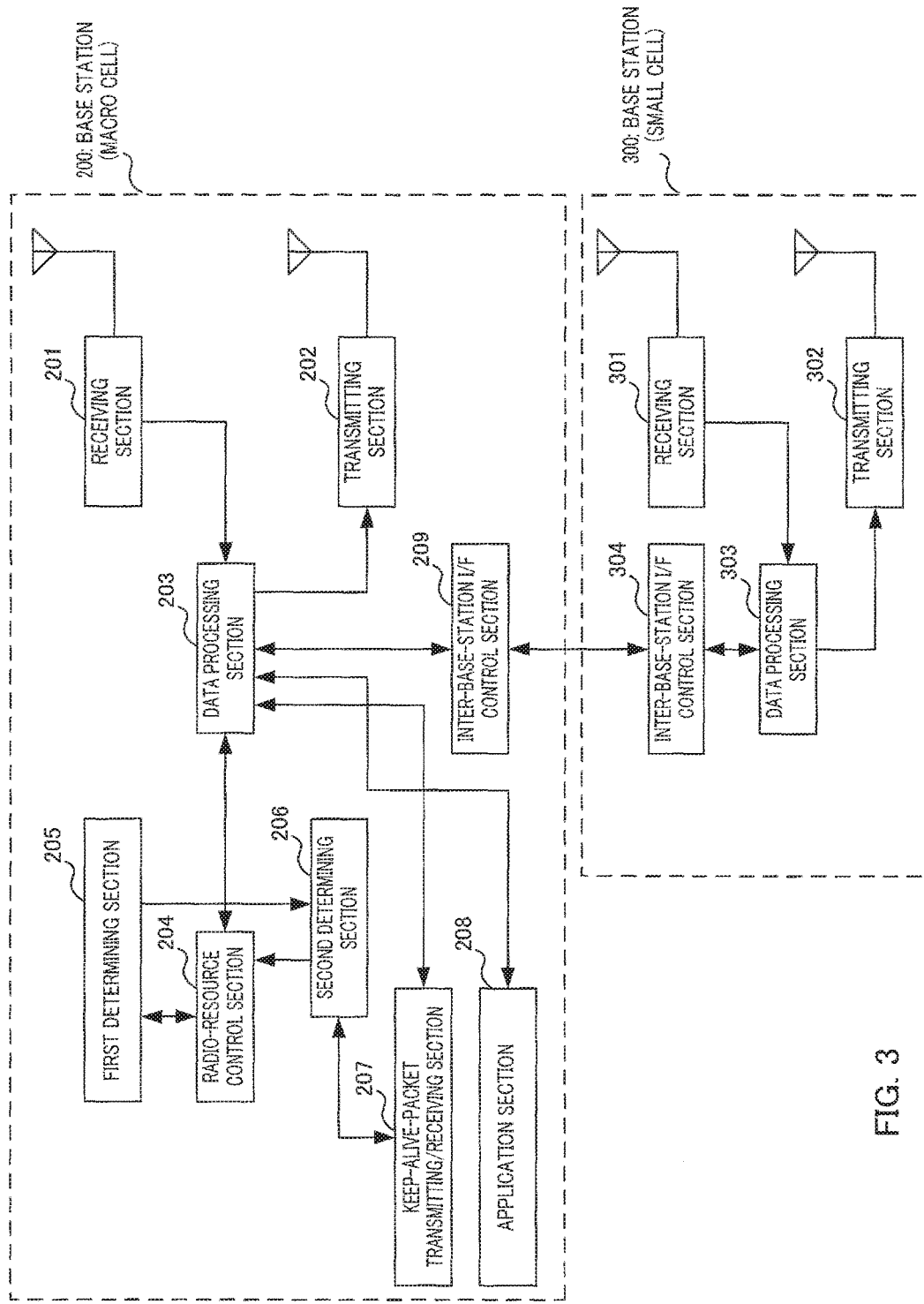
FIG. 3 is a block diagram illustrating a configuration of a macro cell and a small cell according to Embodiment 1 of the present invention.

FIG. 3 is a block diagram illustrating configurations of base station 200 (macro cell) and base station 300 (small cell) according to the present embodiment. For example, base station 200 supports a first radio system and base station 300 supports a second radio system.

[Configuration of Macro Cell (Base Station 200)]

In FIG. 3, base station 200 includes receiving section 201, transmitting section 202, data processing section 203, radio-resource control section 204, first determining section 205, second determining section 206, keep-alive-packet transmitting/receiving section 207, application section 208, inter-base-station I/F control section 209.

Receiving section 201 demodulates a received signal received via an antenna and restores the signal. For example, during C/U separation, the received signal includes only control plane data. Receiving section 201 outputs the restored signal to data processing section 203.

Transmitting section 202 modulates a signal received from data processing section 203 and transmits the modulated signal via an antenna. For example, during C/U separation, the transmission signal includes only control plane data.

Data processing section 203 outputs control plane data out of information received from receiving section 201 or inter-base-station I/F control section 209 to radio-resource control section 204 and outputs user plane data to application section 208. Data processing section 203 multiplexes the control plane data received from radio-resource control section 204 and the user plane data received from application section 208 and outputs the multiplexed signal to transmitting section 202.

During C/U separation, data processing section 203 transmits user plane data received from application section 208 to base station 300 via inter-base-station I/F control section 209 and outputs user plane data received from base station 300 via inter-base-station I/F control section 209 to application section 208. During C/U separation, data processing section 203 outputs control plane data received from radio-resource control section 204 to transmitting section 202 and outputs control plane data received from receiving section 201 to radio-resource control section 204.

Radio-resource control section 204 generates signaling (control plane data) relating to control of radio resources and transmits the signaling to terminal 100 via data processing section 203. Radio-resource control section 204 outputs the presence or absence of a response (ACK) to the signaling to first determining section 205.

Radio-resource control section 204 controls establishment of a connection of radio resources between terminal 100 and base station 200 based on the control plane data received from data processing section 203 and determination result (whether or not terminal 100 is located inside the service area of base station 200) received from first determining section 205. Radio-resource control section 204 outputs control plane data including control information relating to connection establishment to data processing section 203. More specifically, radio-resource control section 204 continues the connection between terminal 100 and base station 200 when the determination result from first determining section 205 shows that terminal 100 is located inside the service area and cuts the connection between terminal 100 and base station 200 when the determination result shows that terminal 100 is located outside the service area.

During C/U separation, when the determination result on base station 200 (macro cell) received from first determining section 205 shows that terminal 100 is outside the service area, radio-resource control section 204 controls establishment of a connection of radio resources between terminal 100 and base station 200 based on the determination result (re-determination result) received from second determining section 206. More specifically, when the determination result received from second determining section 206 shows that terminal 100 is inside the service area, radio-resource control section 204 continues the connection between terminal 100 and base station 200, and cuts the connection between terminal 100 and base station 200 when the determination result shows that terminal 100 is outside the service area.

First determining section 205 determines whether terminal 100 is inside or outside the service area of base station 200 using data about the presence or absence of a response to signaling (control plane data) received from radio-resource control section 204. For example, when a period during which radio-resource control section 204 receives no response exceeds a predetermined period (upon expiration of the timer), first determining section 205 determines that terminal 100 is not in the service area of base station 200 (outside the service area). On the other hand, when radio-resource control section 204 receives a response within a predetermined period, first determining section 205 determines that terminal 100 is inside the service area of base station 200. First determining section 205 outputs the determination result (inside or outside the service area) to radio-resource control section 204 and second determining section 206.

When the determination result on base station 200 received from first determining section 205 shows that terminal 100 is outside the service area, second determining section 206 requests keep-alive-packet transmitting/receiving section 207 to transmit a keep-alive packet. Upon receiving a notice that a response (ACK) to the requested keep-alive packet has been received from keep-alive-packet transmitting/receiving section 207, second determining section 206 determines that terminal 100 is inside the service area of base station 200. On the other hand, upon receiving a notice that no response to the requested keep-alive packet has been received for a predetermined period from keep-alive-packet transmitting/receiving section 207, second determining section 206 determines that terminal 100 is outside the service area of base station 200. That is, upon receiving a response to the keep-alive packet, although second determining section 206 determines, based on the presence or absence of a response to the control plane data, that terminal 100 is outside the service area of base station 200, second determining section 206 assumes that terminal 100 is located inside the service area of base station 200. Second determining section 206 outputs the determination result (re-determination result) to radio-resource control section 204.

At the request from second determining section 206, keep-alive-packet transmitting/receiving section 207 generates a keep-alive packet and outputs the keep-alive packet to data processing section 203. The keep-alive packet is transmitted to terminal 100 via the small cell (base station 300) as user plane data. That is, when first determining section 205 determines that terminal 100 is located outside the service area of base station 200, keep-alive-packet transmitting/receiving section 207 transmits a keep-alive packet that confirms the connection between terminal 100 and the small cell to terminal 100 via the small cell as user plane data. For example, keep-alive-packet transmitting/receiving section 207 may periodically transmit keep-alive packets while a response to the keep-alive packet is returned from terminal 100.

Keep-alive-packet transmitting/receiving section 207 receives a response (ACK) to the keep-alive packet transmitted to terminal 100 from terminal 100 via the small cell (base station 300) as user plane data. Keep-alive-packet transmitting/receiving section 207 confirms whether or not a response (ACK) to the transmitted keep-alive packet is received and outputs the confirmation result (presence or absence of a response) to second determining section 206.

Upon receiving the keep-alive packet transmitted from terminal 100 from data processing section 203, keep-alive-packet transmitting/receiving section 207 generates a response (ACK) to the keep-alive packet and outputs the response to data processing section 203. The response to the keep-alive packet is transmitted to terminal 100 via the small cell as the user plane data.

Application section 208 processes normal application data (user plane data). Application section 208 processes the signal (keep-alive packet or response to the keep-alive packet) received from keep-alive-packet transmitting/receiving section 207 via data processing section 203 in a manner similar to that of the normal application data and outputs the processed data to data processing section 203. On the other hand, application section 208 processes the signal (keep-alive packet or response to the keep-alive packet) received by data processing section 203 from terminal 100 via the small cell in a manner similar to that of the normal application data and outputs the processed data to keep-alive-packet transmitting/receiving section 207 via data processing section 203.

Inter-base-station I/F control section 209 controls an interface that performs communication between base station 200 and base station 300. For example, inter-base-station I/F control section 209 performs inter-base-station transfer using an IP (internet protocol) layer.

Note that a case has been described in FIG. 2 and FIG. 3 where terminal 100 is provided with second determining section 106 and keep-alive-packet transmitting/receiving section 107, and base station 200 (macro cell) is provided with second determining section 206 and keep-alive-packet transmitting/receiving section 207. That is, in FIG. 2 and FIG. 3, both terminal 100 and base station 200 have configurations capable of transmitting a keep-alive packet. However, in the present embodiment, only one of terminal 100 and base station 200 may transmit a keep-alive packet and the other may have a configuration or operation capable of transmitting only a response to the keep-alive packet.

[Configuration of Base Station 300 (Small Cell)]

In FIG. 3, base station 300 includes receiving section 301, transmitting section 302, data processing section 303 and inter-base-station I/F control section 304.

Receiving section 301 demodulates a received signal received via an antenna and restores the signal. For example, during C/U separation, the received signal includes only user plane data transmitted from terminal 100. Receiving section 301 outputs the restored signal to data processing section 303.

Transmitting section 302 modulates the signal received from data processing section 303 and transmits the modulated signal via an antenna. During C/U separation, the transmission signal includes only user plane data.

Data processing section 303 transmits the signal received from receiving section 301 to base station 200 via inter-base-station I/F control section 304. Data processing section 303 outputs a signal received from base station 200 to transmitting section 302 via inter-base-station I/F control section 304. For example, during C/U separation, data processing section 303 outputs user plane data received from base station 200 to transmitting section 302 and outputs user plane data received from receiving section 301 to base station 200.

Inter-base-station I/F control section 304 controls the interface that performs communication between base station 300 and base station 200. For example, inter-base-station I/F control section 304 performs inter-base-station transfer using an IP layer.

[Operations of Terminal 100 and Base Station 200]

Operations of terminal 100 and base station 200 having the above-described configurations will be described.

Figure 4:
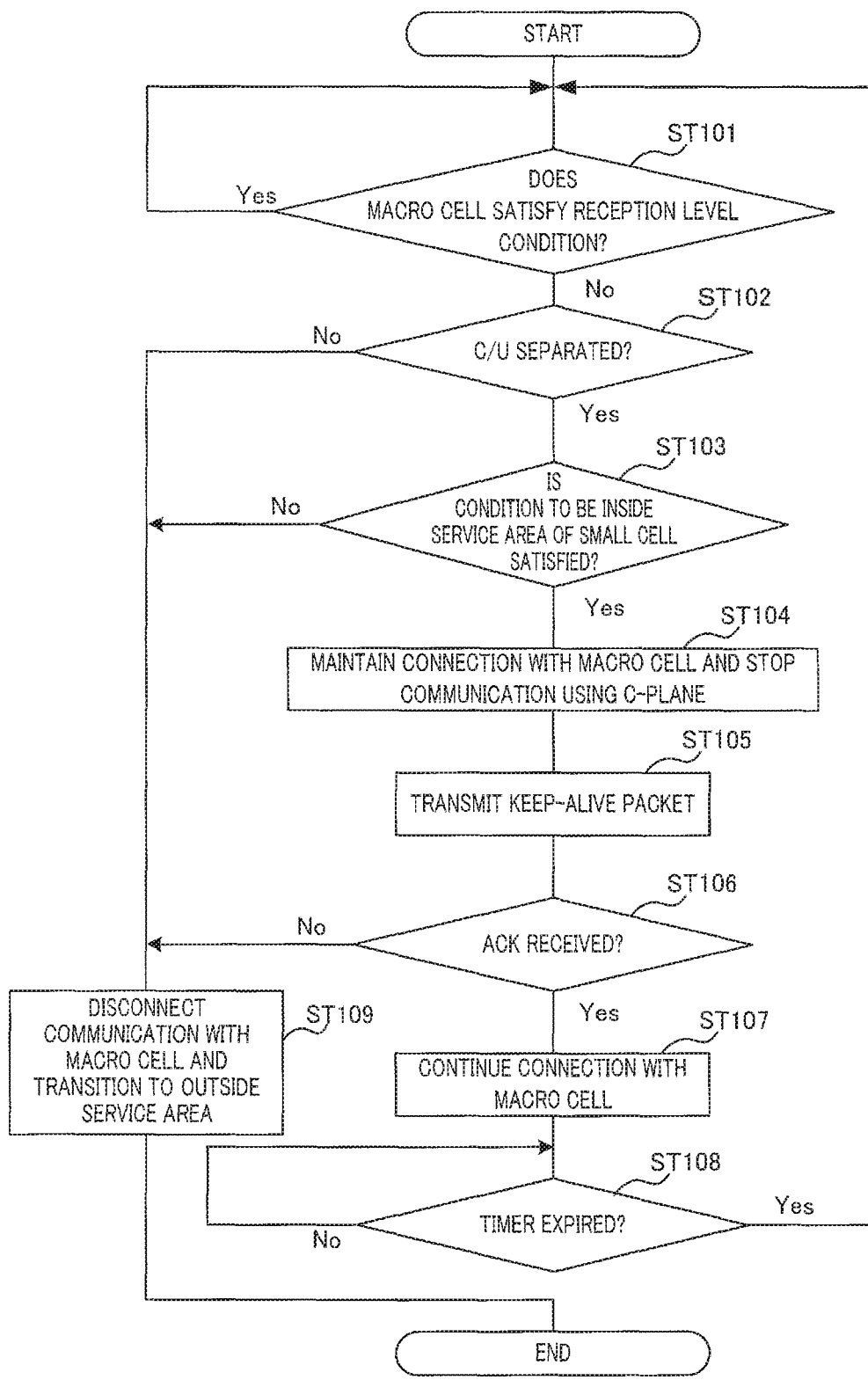
FIG. 4 is a flowchart illustrating an operation of the terminal according to Embodiment 1 of the present invention.
Figure 5:
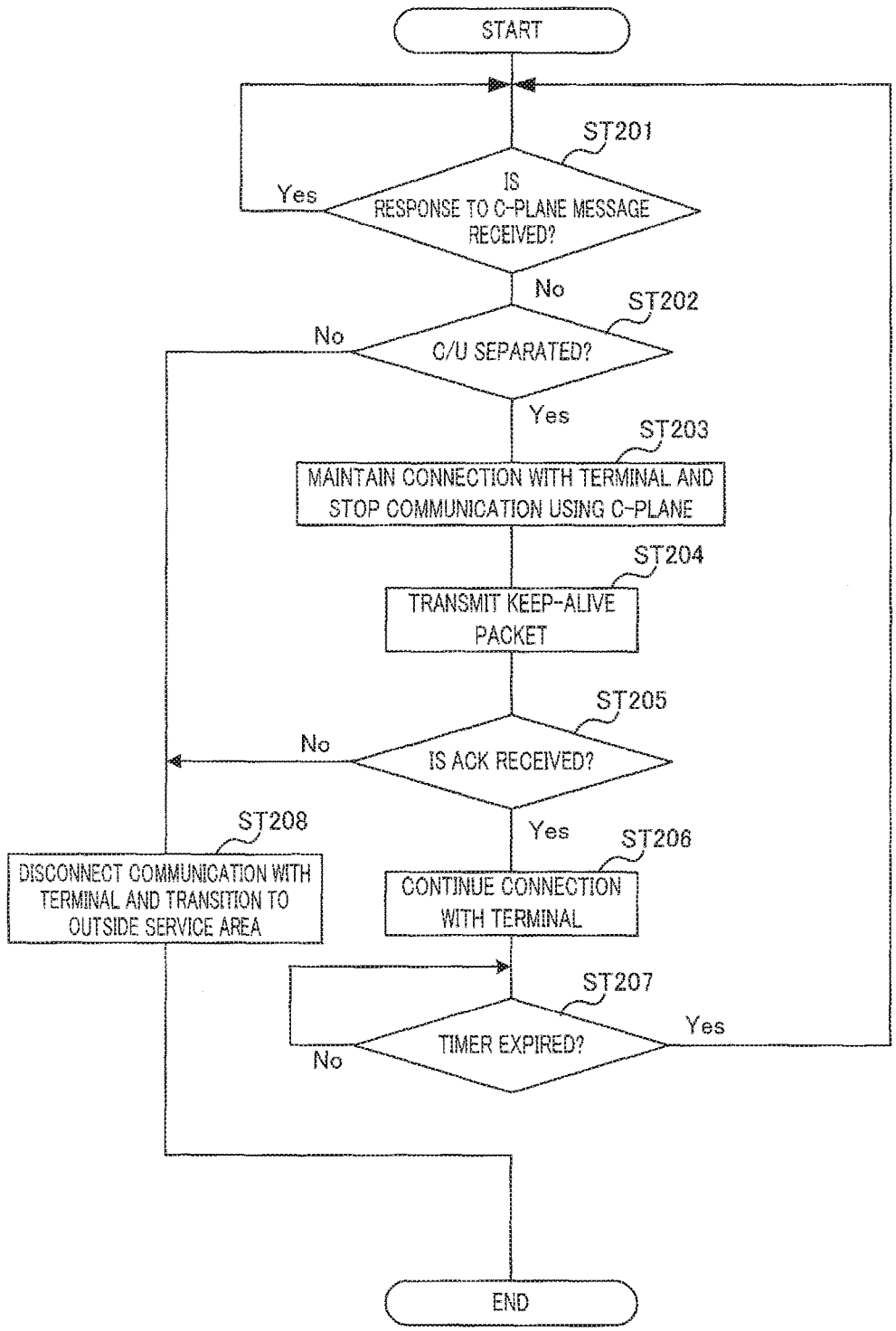
FIG. 5 is a flowchart illustrating an operation of the base station according to Embodiment 1 of the present invention.

FIG. 4 is a flowchart illustrating a processing flow when terminal 100 transmits a keep-alive packet and base station 200 returns a keep-alive packet. FIG. 5 is a flowchart illustrating a processing flow when base station 200 transmits a keep-alive packet and terminal 100 returns a response to the keep-alive packet.

Note that terminal 100 and base station 200 may perform processes shown in FIG. 4 and FIG. 5 simultaneously or may perform only processes on one side. That is, only one of terminal 100 and base station 200 may transmit a keep-alive packet and the other may return a response to the keep-alive packet.

First, a case shown in FIG. 4 where terminal 100 transmits a keep-alive packet will be described.

In step (hereinafter simply denoted as "ST") 101, terminal 100 determines whether or not the reception level of a signal transmitted from base station 200 (macro cell) (e.g., receiving-quality measured value) satisfies a predetermined condition (reception level condition such as a predetermined threshold). When the reception level satisfies the predetermined condition (ST101: Yes, that is, when terminal 100 is inside the service area of base station 200), terminal 100 returns to the process in ST101.

On the other hand, when the reception level does not satisfy the predetermined condition (ST101: No, that is, terminal 100 is outside the service area of base station 200), terminal 100 determines in ST102 whether or not the communication mode with respect to terminal 100 is in a C/U separation state. For example, terminal 100 is notified in advance of whether C/U separation is applied or not through signaling of a higher layer. When a C/U separation state is in progress (ST102: Yes), terminal 100 proceeds to a process in ST103 and when a C/U separation state is not in progress (ST102: No), terminal 100 proceeds to a process in ST109.

In ST103, terminal 100 determines whether or not terminal 100 is located inside the service area of base station 300 (small cell) (whether or not terminal 100 satisfies the condition for terminal 100 to be located inside the service area of the small cell). For example, when the reception level (receiving-quality measured value) of a signal transmitted from base station 300 satisfies a predetermined threshold, terminal 100 determines that terminal 100 is located inside the service area of base station 300. When terminal 100 is located inside the service area of the small cell (ST103: Yes), terminal 100 proceeds to a process in ST104 and proceeds to a process in ST109 when terminal 100 is not located inside the service area of the small cell (ST103: No).

In ST104, terminal 100 stops communication (communication of control plane data) with base station 200 while maintaining the connection with base station 200 (macro cell).

In ST105, terminal 100 transmits a keep-alive packet to base station 200. Note that since direct communication is not possible between terminal 100 and base station 200, terminal 100 transmits a keep-alive packet to base station 200 via base station 300 as user plane data.

Upon receiving the keep-alive packet from terminal 100 in ST105, base station 200 returns a response (ACK) to the keep-alive packet to terminal 100 via base station 300 as user plane data. That is, when communication is possible between terminal 100 and base station 300 (small cell), ACK is returned from base station 200 to terminal 100.

In ST106, terminal 100 determines whether or not the response (ACK) to the keep-alive packet transmitted in ST105 has been received within a predetermined period. When terminal 100 has received ACK (ST106: Yes), terminal 100 proceeds to a process in ST107 and when terminal 100 has not received ACK (ST106: No), terminal 100 proceeds to a process in ST109.

In ST107, terminal 100 determines to continue the connection state (connection) with base station 200 (macro cell). That is, although communication with base station 200 is actually stopped, if the response to the keep-alive packet is received in ST106, that is, communication between terminal 100 and base station 300 is possible, terminal 100 assumes that terminal 100 is located inside the service area of base station 200 and continues the connection with base station 200.

In ST108, terminal 100 determines whether the elapsed time of the timer that has started counting after the process in ST107 exceeds a predetermined period or not (expiration of the timer or not). Upon expiration of the timer (ST108: Yes), terminal 100 returns to the process in ST101. That is, terminal 100 continues the connection with the macro cell until the timer expires (ST108: during "No").

When C/U separation is not applied (ST102: No) or when terminal 100 is outside the service areas of both the macro cell and the small cell (ST103: No or ST106: No), terminal 100 cuts communication with base station 200 in ST109 and transitions to outside the service area of base station 200 (inside a service area of another cell).

Next, a case shown in FIG. 5 where base station 200 transmits a keep-alive packet will be described.

In ST201, base station 200 determines whether or not a response to control plane data (message) transmitted by base station 200 is received from terminal 100. When a response is received (ST201: Yes, that is, terminal 100 is inside the service area of base station 200), base station 200 returns to the process in ST201.

On the other hand, when no response is received (ST201: No, that is, terminal 100 is outside the service area of base station 200), base station 200 determines in ST202 whether or not the communication mode with respect to terminal 100 is a C/U separation state. Base station 200 knows beforehand whether C/U separation is applicable to terminal 100 or not. Base station 200 proceeds to a process in ST203 when the C/U separation state is in progress (ST202: Yes) and proceeds to a process in ST208 when the C/U separation state is not in progress (ST202: No).

In ST203, base station 200 stops communication (communication of control plane data) with terminal 100 while maintaining the connection state with terminal 100.

In ST204, base station 200 transmits a keep-alive packet to terminal 100. Note that since direct communication between terminal 100 and base station 200 is not possible, base station 200 transmits a keep-alive packet to terminal 100 via base station 300 as user plane data.

Upon receiving the keep-alive packet from base station 200 in ST204, terminal 100 returns a response (ACK) to the keep-alive packet to base station 200 via base station 300 as user plane data. That is, when communication between terminal 100 and base station 300 (small cell) is possible, ACK is returned from terminal 100 to base station 200.

In ST205, base station 200 determines whether or not a response (ACK) to the keep-alive packet transmitted in ST204 has been received within a predetermined period. Upon receiving ACK (ST205: Yes), base station 200 proceeds to a process in ST206 and proceeds to a process in ST208 upon receiving no ACK (ST205: No).

In ST206, base station 200 determines to continue the connection state with terminal 100. That is, although communication with terminal 100 is actually stopped, if a response to the keep-alive packet is received in ST205, that is, when communication between terminal 100 and base station 300 is possible, base station 200 assumes that terminal 100 is inside the service area of base station 200 and base station 200 continues the connection with terminal 100.

In ST207, base station 200 determines whether or not the elapsed time of the timer that has started counting after a process in ST206 exceeds a predetermined period (expiration of the timer or not). Upon expiration of the timer (ST207: Yes), base station 200 returns to the process in ST201. That is, base station 200 continues the connection with terminal 100 until the timer expires (ST207: during "No").

When C/U separation is not applied (ST202: No) or when terminal 100 is outside the service areas of both the macro cell and the small cell (ST205: No), base station 200 cuts communication with terminal 100 in ST208 and causes terminal 100 to transition to outside the service area of base station 200 (inside the service area of another cell).

As described above, when terminal 100 is located outside the service area of the macro cell (base station 200), terminal 100 and/or base station 200 transmit(s) a keep-alive packet, as long as there is a response (ACK) to the keep-alive packet, base station 200 assumes that terminal 100 is located inside the service area of base station 200 and continues communication using a user plane while maintaining the connection of the control plane. When communication between terminal 100 and base station 200 becomes possible while continuing the connection of the control plane, terminal 100 and base station 200 resume communication of control plane data (C-Plane).

Figure 6:
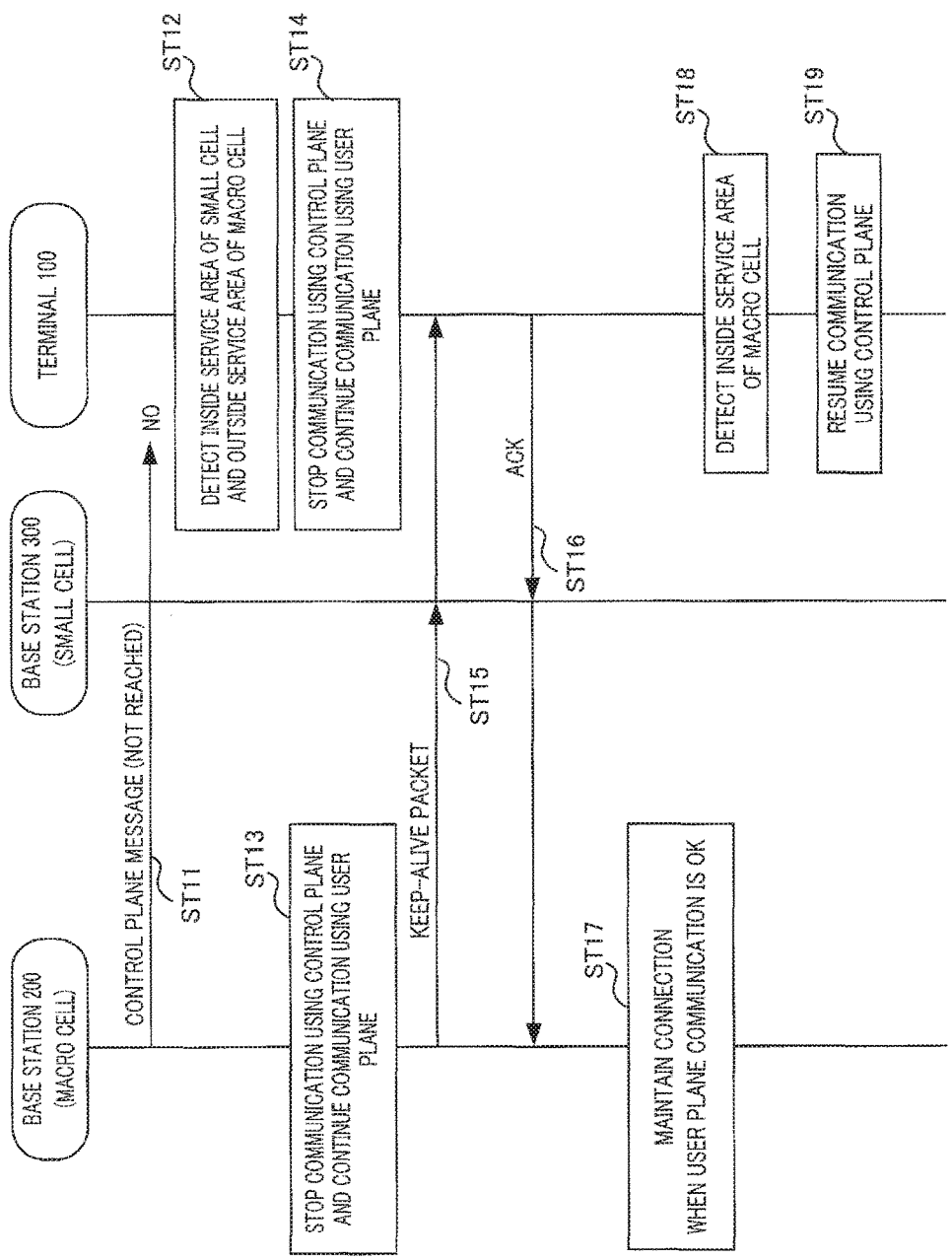
FIG. 6 is a sequence diagram illustrating an operation of the communication system according to Embodiment 1 of the present invention.

Next, FIG. 6 is a sequence diagram illustrating exchange of signals among terminal 100, base station 200 (macro cell) and base station 300 (small cell).

In FIG. 6, C/U separation is applied to terminal 100, base station 200 performs communication using a control plane and base station 300 performs communication using a user plane.

In ST11, base station 200 transmits a control plane message to terminal 100. However, the control plane message does not reach terminal 100 in ST11.

In this case, base station 200 cannot receive a response to the control plane message transmitted in ST11 from terminal 100. Thus, base station 200 determines that terminal 100 is located outside the service area of base station 200. Terminal 100 determines that the reception level of the signal from base station 200 does not satisfy a predetermined condition. Here, suppose terminal 100 is located inside the service area of base station 300. Thus, in ST12, terminal 100 detects that terminal 100 is located inside the service area of base station 300 and located outside the service area of base station 200.

In ST13 and ST14, base station 200 and terminal 100 stop communication of the control plane while continuing communication of the user plane.

In ST15, base station 200 transmits a keep-alive packet to terminal 100 via base station 300. Upon receiving a keep-alive packet in ST15, terminal 100 transmits a response to the keep-alive packet to base station 200 via base station 300 in ST16.

Note that the macro cell transmits a keep-alive packet in FIG. 6 as an example, but terminal 100 may also transmit a keep-alive packet and base station 200 may transmit a response to the keep-alive packet in ST15 and ST16.

Upon receiving the response to the keep-alive packet in ST16, base station 200 determines in ST17 that communication is possible using the user plane between terminal 100 and base station 300. In this case, although base station 200 cannot communicate with terminal 100 using the control plane, base station 200 maintains the connection using the control plane. Thus, even when terminal 100 is located outside the service area of base station 200 which is a macro cell, base station 200 continues movement management on terminal 100, and base station 300 which is a small cell can continue data communication.

While communication using the control plane between base station 200 and terminal 100 is stopped but the connection is continued, if it is detected that terminal 100 is located again inside the service area of base station 200 (ST18), terminal 100 resumes communication using the control plane in ST19.

Figure 7:
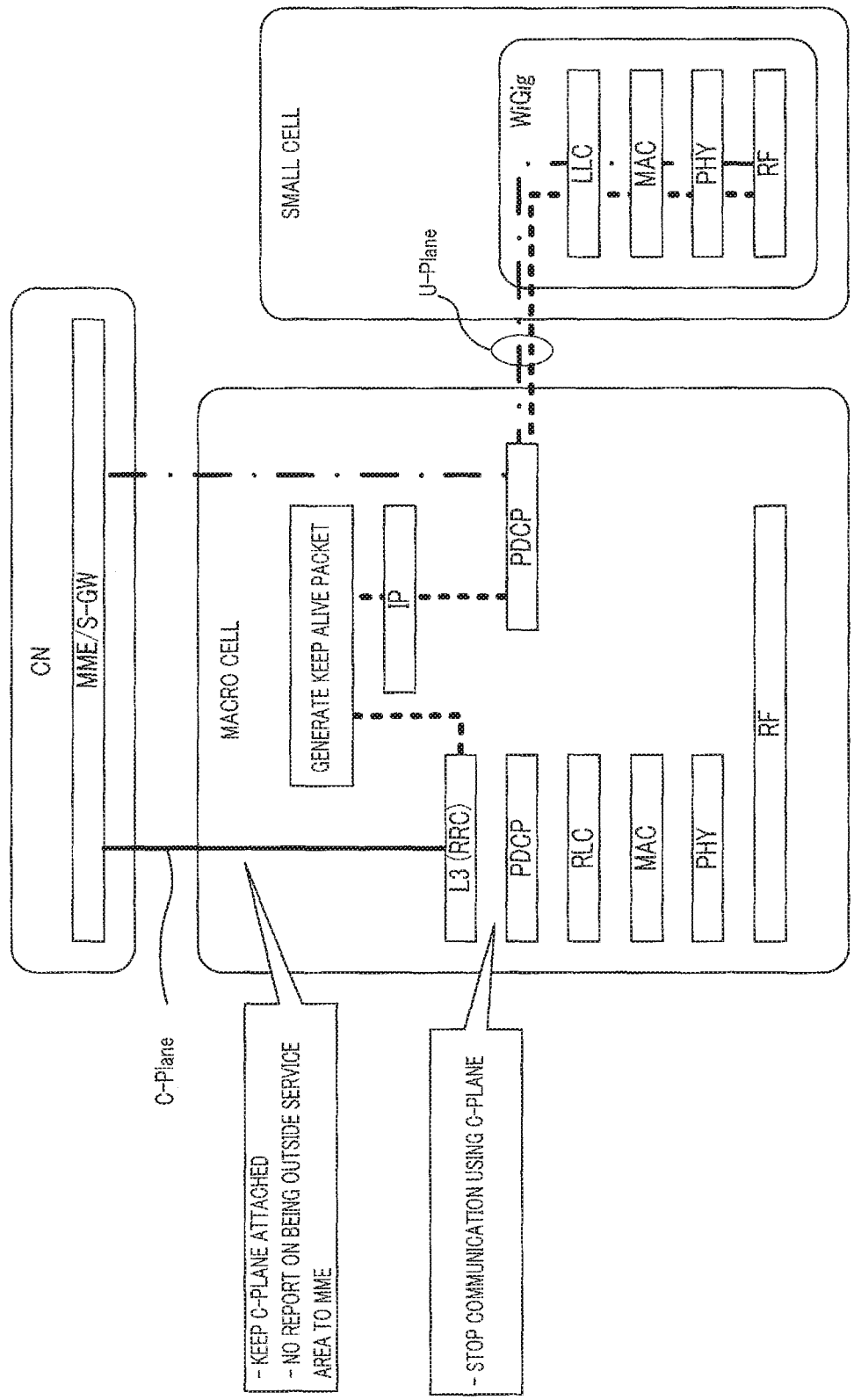
FIG. 7 is a diagram illustrating protocol stacks of the macro cell and the small cell according to Embodiment 1 of the present invention.

FIG. 7 is a diagram provided for describing exchange of information using protocol stacks between base station 200 and base station 300 (small cell) while communication using the control plane between base station 200 (macro cell) and terminal 100 is stopped but the connection is continued.

Note that in FIG. 7, base station 200 applies, for example, an LTE-Advanced system. In this case, base station 200 includes, for the control plane, at least an RF (radio frequency) layer, a PHY (physical) layer, a MAC (medium access control) layer, an RLC (radio link control) layer, a PDCP (packet data control protocol) layer and an RRC (radio resource control) layer. Furthermore, base station 200 includes at least a PDCP layer for the user plane. The RF layer and the PHY layer correspond to layer 1 (L1), the MAC layer, the RLC layer and the PDCP layer correspond to layer 2 (L2) and the RRC layer corresponds to layer 3 (L3). For example, in base station 200 shown in FIG. 3, receiving section 201 and transmitting section 202 correspond to layer 1, data processing section 203 corresponds to layer 2, and first determining section 205 and second determining section 206 correspond to layer 3.

In FIG. 7, base station 300 applies a WiGig system as a radio system different from base station 200. In this case, base station 300 includes at least an RF layer, a PHY layer, a MAC layer, and an LLC (logical link control) layer for the user plane. For example, in base station 300 shown in FIG. 3, receiving section 301 and transmitting section 302 correspond to the RF layer and PHY layer and data processing section 303 corresponds to the MAC layer and the LLC layer. Note that a case will be described in FIG. 7 where the small cell applies a radio system different from that of the macro cell, but the small cell is not limited to this, and the small cell may be a WiFi system or have a configuration in the same radio system as that of the macro cell in which only communication using a user plane can be implemented.

In FIG. 7, a core network (CN) is provided with MME/S-GW (mobility management entity/serving gateway).

For example, when it is determined that terminal 100 is outside the service area of base station 200, base station 200 generates a keep-alive packet in the IP layer and transmits the keep-alive packet generated using the user plane. Base station 200 receives a response to the keep-alive packet using the user plane. That is, terminal 100 and base station 200 exchange keep-alive packets via the small cell and using the user plane. Thus, when base station 200 can obtain a response to the keep-alive packet, it is determined that communication is possible between terminal 100 and base station 300.

At this time, as long as a response to the keep-alive packet is obtained, base station 200 continues the connection of the control plane. More specifically, as shown in FIG. 7, although base station 200 stops communication using the control plane, base station 200 does not report to the core network (e.g., MME) that terminal 100 is outside the service area, but keeps the control plane "attached." When communication between terminal 100 and base station 200 is made possible again by continuation of the connection of the control plane, terminal 100 and base station 200 are allowed to resume transmission/reception of control plane data without performing further connection processing.

By this means, according to the present embodiment, when the terminal is outside the service area of the macro cell during C/U separation, the terminal and the macro cell transmit/receive a keep-alive packet using the user plane. When a response to the keep-alive packet is obtained, the terminal and the macro cell continue the connection of the control plane between the terminal and the macro cell. That is, as long as communication is possible between the terminal and the small cell using the user plane, it is possible to maintain the connection between the terminal and the macro cell even when communication between the terminal and the macro cell is not possible.

Transmission/reception of a keep-alive packet between the terminal and the macro cell is performed using the user plane. Thus, even when the macro cell and the small cell are mutually different radio systems, the terminal and the macro cell can perform control to maintain the connection between the terminal and the macro cell using the user plane. Similarly, even when the macro cell and the small cell are the same radio system, and the small cell is provided with only a communication function using a user plane, the terminal and the macro cell can likewise perform control to maintain the connection between the terminal and the macro cell using the user plane.

As described above, according to the present embodiment, in a heterogeneous network in which a macro cell performs movement management using a control plane and a small cell handles a user plane, even when the macro cell is located outside the service area, it is possible to continue data communication in the small cell while continuing movement management in the macro cell.

Embodiment 2

[Configuration of Terminal 400]

Figure 8:
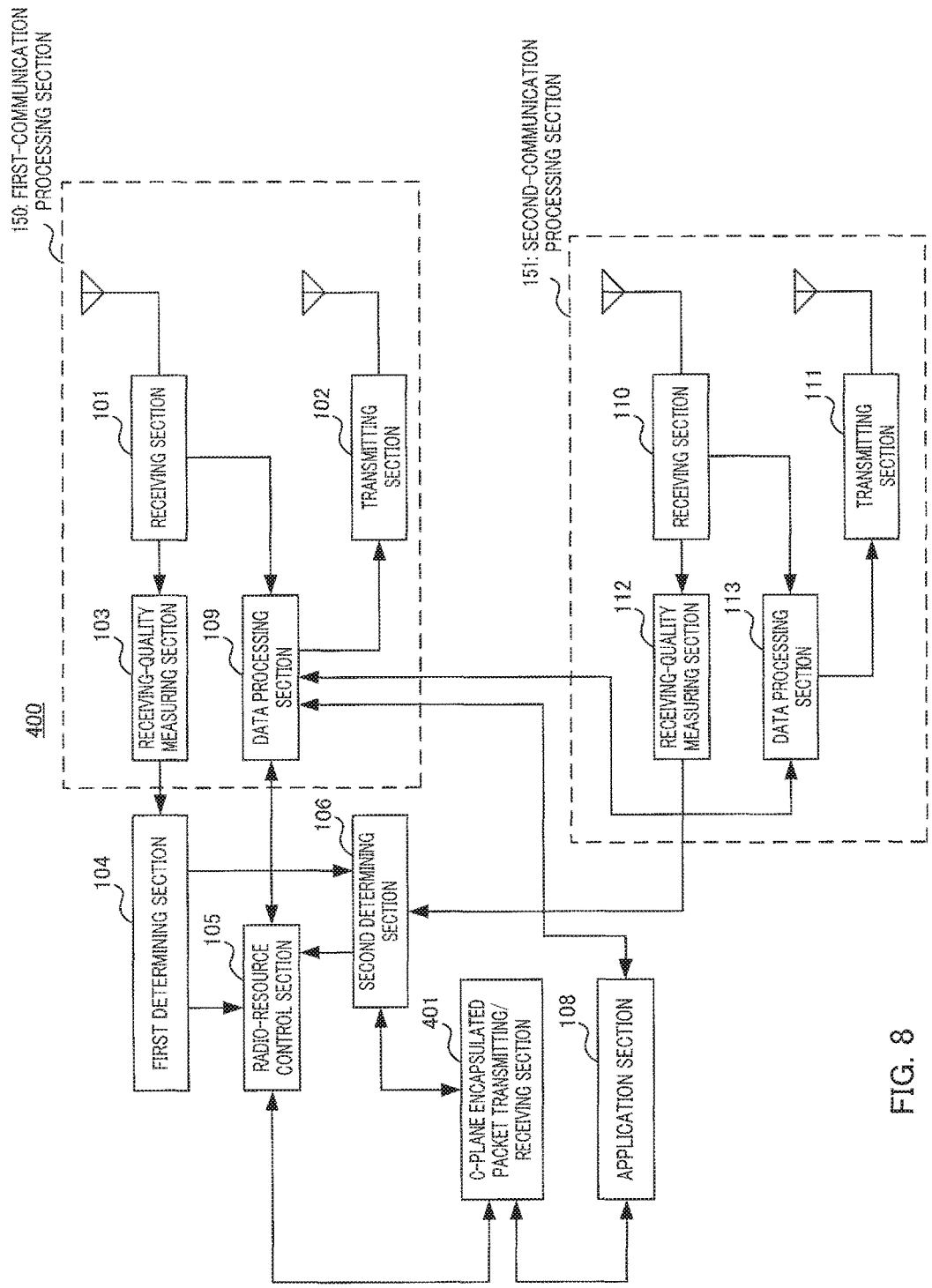
FIG. 8 is a block diagram illustrating a configuration of a terminal according to Embodiment 2 of the present invention.

FIG. 8 is a block diagram illustrating a configuration of terminal 400 according to the present embodiment. Note that in FIG. 8, components identical to those in Embodiment 1 (FIG. 2) are assigned identical reference numerals and the description thereof will be omitted.

In terminal 400 shown in FIG. 8, when first determining section 104 determines that terminal 400 is outside the service area of a macro cell (base station 500 which will be described later) and that terminal 400 is inside the service area of a small cell (base station 300), second determining section 106 instructs C-Plane encapsulated packet transmitting/receiving section 401 to encapsulate control plane data.

Upon receiving a notice that a response (ACK) to the encapsulated control plane data is received from C-Plane encapsulated packet transmitting/receiving section 401, second determining section 106 re-determines that terminal 100 is inside the service area of the macro cell. On the other hand, upon receiving a notice that no response to the encapsulated control plane data is received for a predetermined period from C-Plane encapsulated packet transmitting/receiving section 401, second determining section 106 re-determines that terminal 100 is outside the service area of the macro cell. That is, upon receiving a response to the encapsulated control plane data, second determining section 106 assumes, based on receiving quality, that terminal 400 is located inside the service area of the macro cell although terminal 400 is determined to be outside the service area of the macro cell. Second determining section 106 outputs the determination result (re-determination result) to radio-resource control section 105.

Upon receiving an instruction for encapsulation from second determining section 106, C-Plane encapsulated packet transmitting/receiving section 401 receives control plane data from radio-resource control section 105. C-Plane encapsulated packet transmitting/receiving section 401 encapsulates (tunneling) the received control plane data as an IP packet and outputs the encapsulated data to application section 108. C-Plane encapsulated packet transmitting/receiving section 401 extracts control plane data from the IP packet (encapsulated data) received from application section 108 and outputs the control plane data to radio-resource control section 105. Upon receiving a response (ACK) to the control plane data as the IP packet from application section 108 or upon receiving a response to the control plane data from radio-resource control section 105, C-Plane encapsulated packet transmitting/receiving section 401 outputs a notice that a response to the control plane data is received to second determining section 106.

Thus, C-Plane encapsulated packet transmitting/receiving section 401 encapsulates the control plane data, transmits the encapsulated control plane data (IP packet) as a confirmation packet for confirming a connection between terminal 400 and the small cell and receives a response to the control plane data encapsulated in the macro cell.

During C/U separation, when the determination result on base station 500 (macro cell) received from first determining section 104 shows that terminal 400 is outside the service area, radio-resource control section 105 controls establishment of a connection of radio resources with the macro cell based on the determination result (re-determination result) received from second determining section 106. More specifically, radio-resource control section 105 continues the connection with the macro cell (base station 500) when the determination result received from second determining section 106 shows that terminal 400 is inside the service area and disconnects the connection with the macro cell when the determination result shows that terminal 400 is outside the service area.

During the continuation of the connection with the macro cell (base station 500), radio-resource control section 105 outputs control plane data directed to base station 500 to C-Plane encapsulated packet transmitting/receiving section 401 and receives control plane data from base station 500 from C-Plane encapsulated packet transmitting/receiving section 401 based on the determination result of second determining section 106.

Application section 108 outputs the encapsulated data received from C-Plane encapsulated packet transmitting/receiving section 401 to data processing section 109 as user plane data. Furthermore, upon receiving user plane data including the encapsulated data from data processing section 109, application section 108 outputs the data to C-Plane encapsulated packet transmitting/receiving section 401.

[Configuration of Macro Cell (Base Station 500)]

Figure 9:
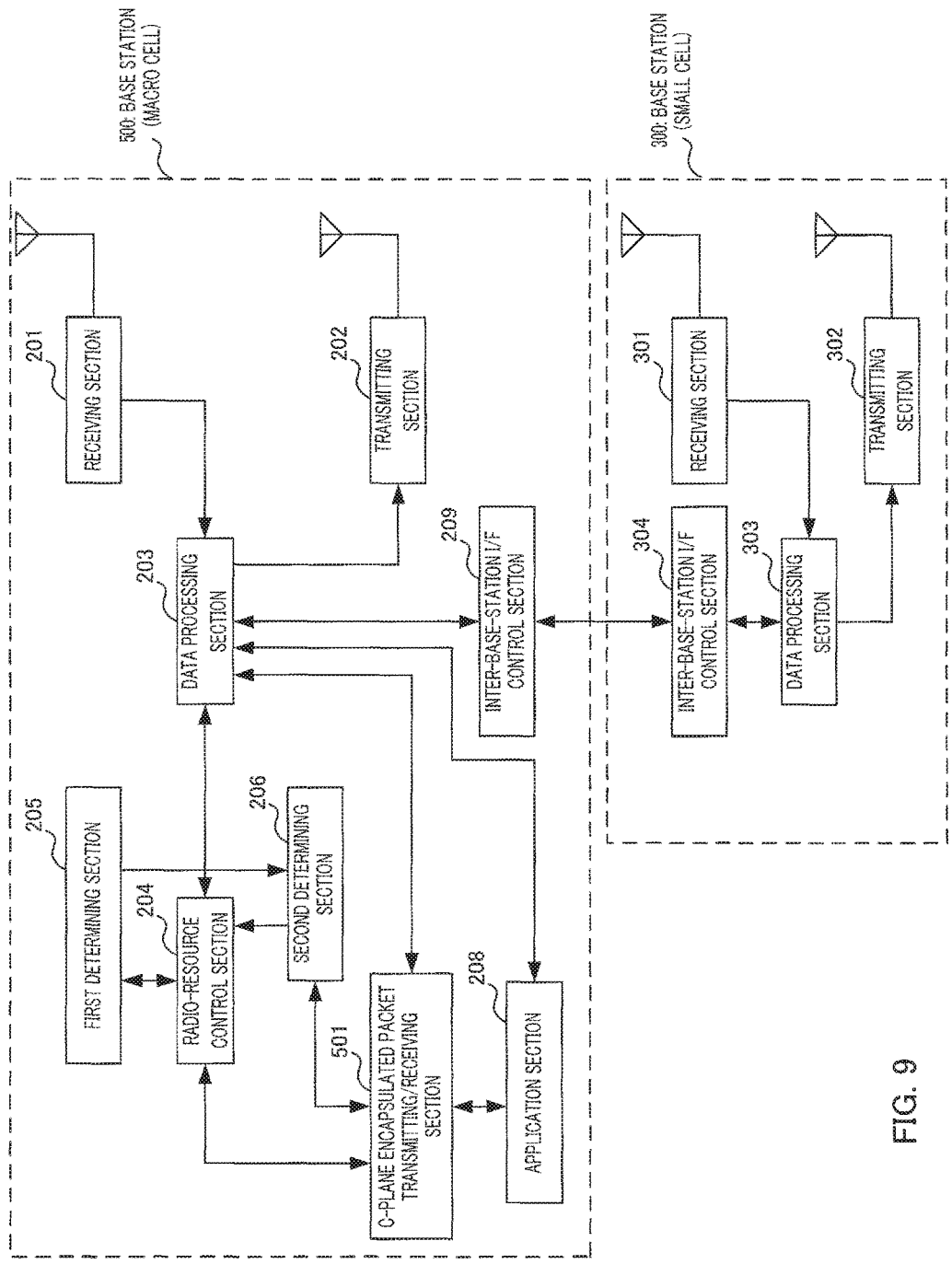
FIG. 9 is a block diagram illustrating a configuration of a macro cell and a small according to Embodiment 2 of the present invention.

FIG. 9 is a block diagram illustrating a configuration of base station 500 according to the present embodiment. Note that in FIG. 9, components identical to those in Embodiment 1 (FIG. 3) are assigned identical reference numerals and the description thereof will be omitted.

In base station 500 shown in FIG. 9, when first determining section 205 determines that terminal 400 is not located in the service area of base station 500, second determining section 206 instructs C-Plane encapsulated packet transmitting/receiving section 501 to encapsulate control plane data.

Upon receiving a notice that a response (ACK) to the encapsulated control plane data is received from C-Plane encapsulated packet transmitting/receiving section 501, second determining section 206 re-determines that terminal 100 is located in the service area (inside the service area) of base station 200. On the other hand, upon receiving a notice that no response to the encapsulated control plane data is received for a predetermined period from C-Plane encapsulated packet transmitting/receiving section 501, second determining section 206 re-determines that terminal 100 is not located in the service area (outside the service area) of base station 200. That is, upon receiving a response to the encapsulated control plane data, although it is determined, based on receiving quality, that terminal 400 is outside the service area of base station 500, second determining section 206 assumes that terminal 400 is located inside the service area of base station 500. Second determining section 206 outputs the determination result (re-determination result) to radio-resource control section 204.

Upon receiving an instruction for encapsulation from second determining section 206, C-Plane encapsulated packet transmitting/receiving section 501 receives the control plane data from radio-resource control section 204. C-Plane encapsulated packet transmitting/receiving section 501 encapsulates the received control plane data as an IP packet and outputs the encapsulated data to application section 208. C-Plane encapsulated packet transmitting/receiving section 501 extracts the control plane data from the IP packet (encapsulated data) received from application section 108 and outputs the control plane data to radio-resource control section 204. Upon receiving a response (ACK) to the control plane data from application section 208 as an IP packet, or upon receiving a response to the control plane data from radio-resource control section 204, C-Plane encapsulated packet transmitting/receiving section 501 outputs a notice of such receipt of the response to the control plane data to second determining section 206.

Thus, C-Plane encapsulated packet transmitting/receiving section 501 encapsulates the control plane data, transmits the encapsulated control plane data (IP packet) as a confirmation packet for confirming a connection between terminal 400 and the small cell and receives a response to the control plane data encapsulated by terminal 400.

During C/U separation, when the determination result on base station 500 (macro cell) received from first determining section 205 shows that terminal 400 is outside the service area, radio-resource control section 204 controls establishment of a connection of radio resources between terminal 400 and base station 500 based on the determination result (re-determination result) received from second determining section 206. More specifically, when the determination result received from second determining section 206 shows that terminal 400 is inside the service area, radio-resource control section 204 continues the connection between terminal 400 and base station 500, and disconnects the connection between terminal 400 and base station 500 when the determination result shows that terminal 400 is outside the service area.

While the connection between terminal 400 and base station 500 is continued based on the determination result of second determining section 206, radio-resource control section 204 outputs control plane data directed to terminal 400 to C-Plane encapsulated packet transmitting/receiving section 501 and receives control plane data from terminal 400 from C-Plane encapsulated packet transmitting/receiving section 501.

Application section 208 outputs the encapsulated data received from C-Plane encapsulated packet transmitting/receiving section 501 as user plane data to data processing section 203. Upon receiving the user plane data including the encapsulated data from data processing section 203, application section 208 outputs the data to C-Plane encapsulated packet transmitting/receiving section 501.

[Operations of Terminal 400 and Base Station 500]

Operations of terminal 400 and base station 500 having the above-described configurations will be described.

Figure 10:
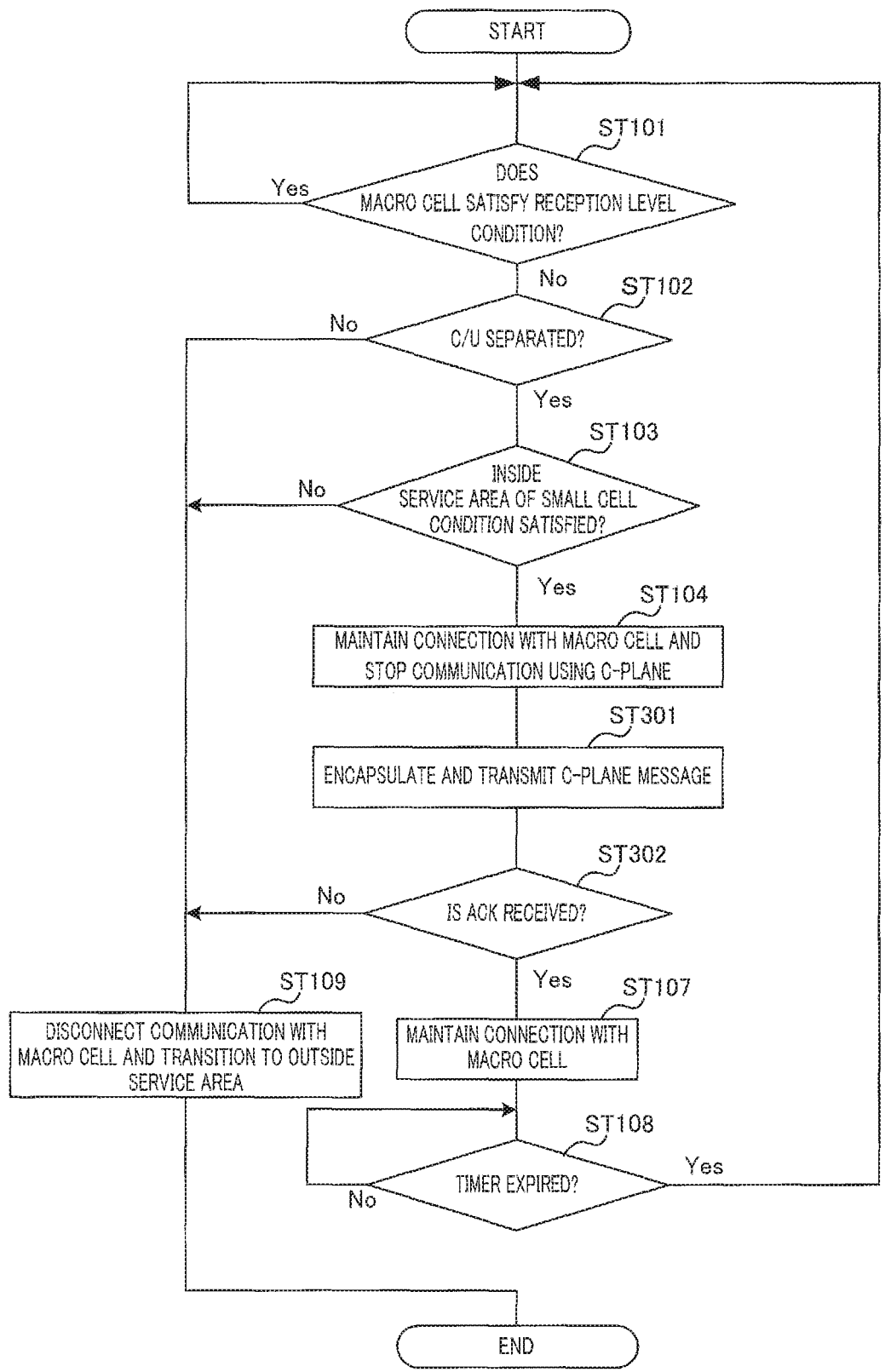
FIG. 10 is a flowchart illustrating an operation of the terminal according to Embodiment 2 of the present invention.
Figure 11:
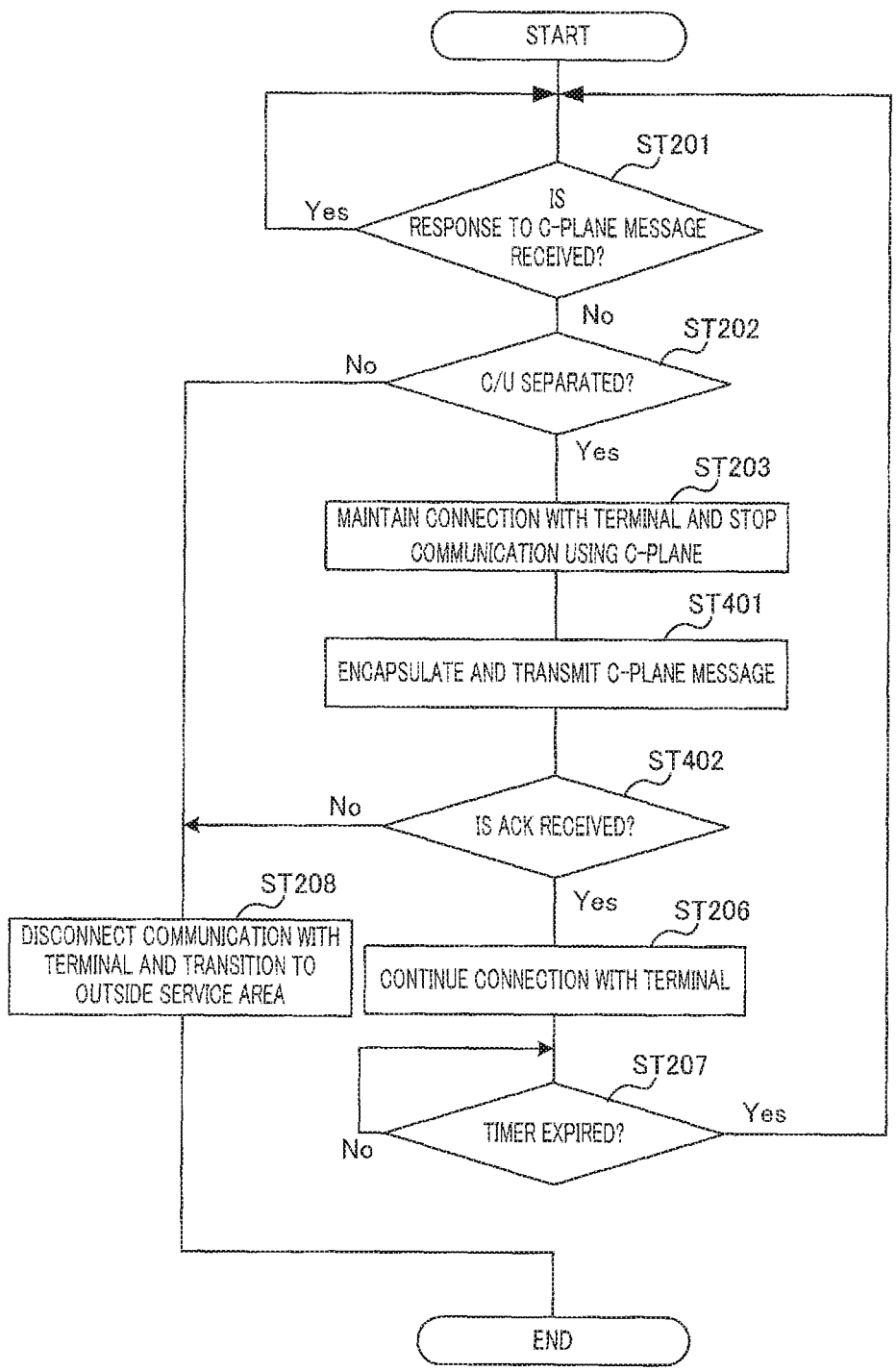
FIG. 11 is a flowchart illustrating an operation of the base station according to Embodiment 2 of the present invention.

FIG. 10 is a flowchart illustrating a processing flow when terminal 400 encapsulates and transmits control plane data (C-Plane message). FIG. 11 is a flowchart illustrating a processing flow when base station 500 encapsulates and transmits control plane data.

Note that in FIG. 10 and FIG. 11, processes identical to those in Embodiment 1 (FIG. 4, FIG. 5) are assigned identical reference numerals and the description thereof will be omitted.

First, a case will be described where terminal 400 shown in FIG. 10 encapsulates and transmits control plane data.

In FIG. 10, in ST301, terminal 400 encapsulates control plane data and transmits the encapsulated data to base station 500 via base station 300 (small cell) as user plane data. Upon receiving the encapsulated control plane data from terminal 400 in ST301, base station 500 encapsulates a response (ACK) to the control plane data and returns the encapsulated response to terminal 400 via base station 300 as user plane data.

In ST302, terminal 400 determines whether or not terminal 400 has received a response (ACK) to the control plane data transmitted in ST301 within a predetermined period. When terminal 400 has received ACK (ST302: Yes), terminal 400 proceeds to a process in ST107 and proceeds to a process in ST109 when terminal 400 has not received ACK (ST302: No).

Next, a case will be described where base station 500 shown in FIG. 11 encapsulates and transmits control plane data.

In FIG. 11, in ST401, base station 500 encapsulates control plane data and transmits the encapsulated data to terminal 400 via base station 300 as user plane data. Upon receiving the control plane data encapsulated in ST401 from base station 500, terminal 400 encapsulates a response (ACK) to the control plane data and returns the encapsulated response to base station 500 via base station 300 as user plane data.

In ST402, base station 500 determines whether or not base station 500 has received a response (ACK) to the keep-alive packet transmitted in ST401 within a predetermined period. Base station 500 proceeds to a process in ST206 when base station 500 has received ACK (ST401: Yes) and proceeds to a process in ST208 when base station 500 has not received ACK (ST401: No).

As described above, when terminal 400 is located outside the service area of the macro cell (base station 500), terminal 400 and/or base station 500 encapsulate(s) and transmit(s) control plane data, assume(s), as long as there is a response (ACK) to the control plane data, that terminal 400 is located inside the service area of base station 500 and continue(s) communication using a user plane while maintaining the connection of the control plane. During the continuation of the connection of the control plane, if communication between terminal 400 and base station 500 is made possible, terminal 400 and base station 500 resume communication of control plane data (C-Plane).

Figure 12:
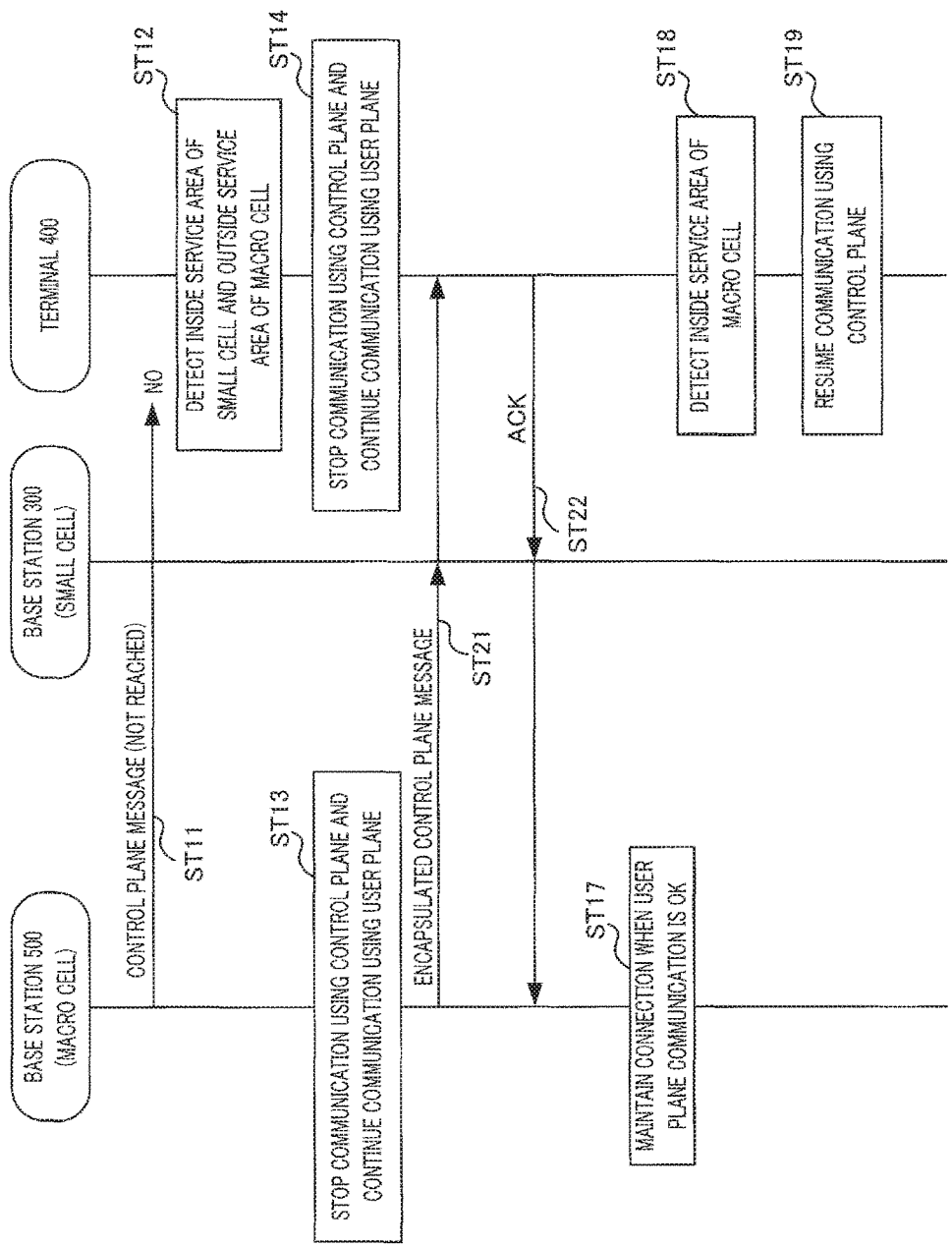
FIG. 12 is a sequence diagram illustrating an operation of a communication system according to Embodiment 2 of the present invention.

Next, FIG. 12 is a sequence diagram illustrating exchange of signals among terminal 400, base station 500 (macro cell) and base station 300 (small cell). Note that in FIG. 12, processes identical to those in Embodiment 1 (FIG. 6) are assigned identical reference numerals and the description thereof will be omitted.

In FIG. 12, C/U separation is applied to terminal 400 as in the case of FIG. 6 and base station 500 performs communication using a control plane and base station 300 performs communication using a user plane.

In FIG. 12, in ST21, base station 500 encapsulates control plane data (control plane message) and transmits the encapsulated control plane data to terminal 400 via base station 300. When terminal 400 has received the encapsulated control plane data in ST21, terminal 400 transmits a response to the control plane data to base station 500 via base station 300 in ST22. Note that although FIG. 12 shows a case where the macro cell transmits control plane data as an example, terminal 400 may also transmit the encapsulated control plane data and base station 500 may transmit a response to the control plane data.

Thus, even when terminal 400 is located outside the service area of base station 500 which is a macro cell, base station 500 transmits/receives encapsulated control plane data using the user plane, and base station 500 can thereby continue movement management on terminal 400, and base station 300 which is a small cell can continue data communication.

As described above, FIG. 13 is a diagram provided for describing exchange of information using protocol stacks among terminal 400, base station 500 (macro cell) and base station 300 (small cell) while communication using the control plane between base station 500 (macro cell) and terminal 400 is stopped but the connection is still continued.

Figure 13:
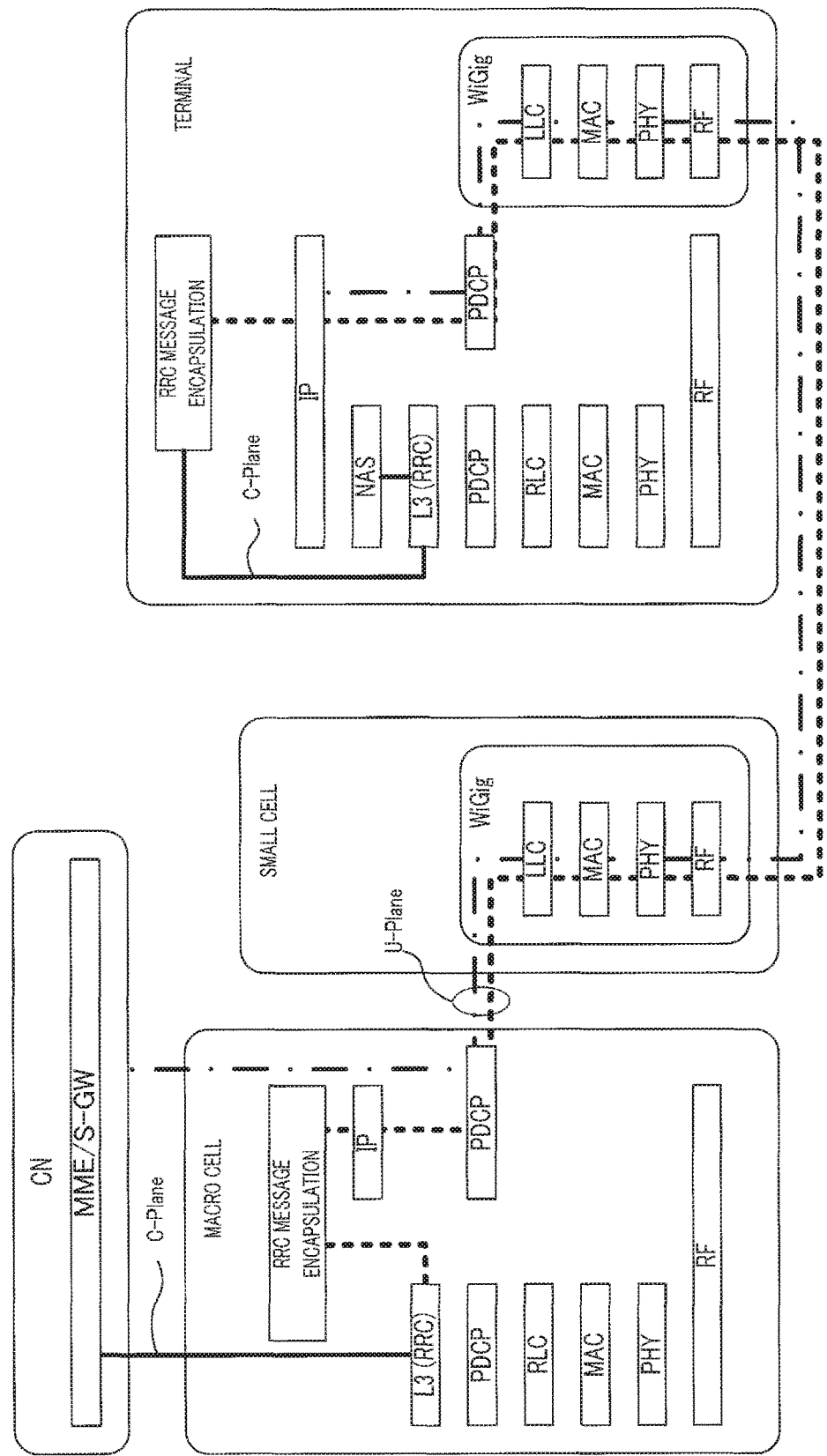
FIG. 13 is a diagram illustrating protocol stacks of the macro cell, the small cell and the terminal according to Embodiment 2 of the present invention.

Note that in FIG. 13, as in the case of FIG. 7, base station 500 applies, for example, an LTE-Advanced system, and base station 300 applies a WiGig radio system as a radio system different from that of base station 200. As shown in FIG. 13, terminal 400 has functions of both the LTE-Advanced system and the WiGig system. More specifically, terminal 400 has at least an RF layer, a PHY layer, a MAC layer, an RLC layer, a PDCP layer, an RRC layer, and an NAS (non access stratum) layer for the control plane of the LIE-Advanced system. Moreover, terminal 400 has at least an RF layer, a PHY layer, a MAC layer and an LLC layer for the user plane of the WiGig radio system.

For example, when it is determined that terminal 400 is outside the service area of base station 500, base station 500 encapsulates the control plane data (RRC message) as an IP layer packet and transmits the generated control plane data using the user plane. Base station 500 receives a response to the encapsulated control plane data using the user plane. That is, terminal 400 and base station 500 exchange the control plane data and its response via the small cell using the user plane. Thus, when base station 500 can obtain a response to the control plane data transmitted/received using the user plane, it is determined that communication is possible between terminal 400 and base station 300.

At this time, as long as a response to the encapsulated control plane data is obtained, base station 500 continues the connection of the control plane. More specifically, as shown in FIG. 13, although base station 500 stops communication of the control plane data using the control plane, base station 500 keeps the control plane "attached" without notifying the core network (e.g., MME) that terminal 400 is outside the service area. Since the connection of the control plane is continued, if communication between terminal 400 and base station 500 is made possible again, terminal 400 and base station 500 can resume transmission/reception of control plane data using the control plane without performing further connection processing.

By this means, according to the present embodiment, during C/U separation, when the terminal is located outside the service area of the macro cell, the terminal and the macro cell transmit/receive the encapsulated control plane data using the user plane. When a response to the control plane data transmitted/received using the user plane is obtained, the terminal and the macro cell continue the connection of the control plane between the terminal and the macro cell. That is, when communication of the user plane between the terminal and the small cell is possible, it is possible to maintain the connection between the terminal and the macro cell even when communication between the terminal and the macro cell is not possible.

Even when direct communication between the terminal and the small cell is not possible, the control plane data is transmitted/received using the user plane. Thus, even when the macro cell and the small cell are different radio systems, the macro cell can communicate the control plane data using the user plane and can execute movement management uninterruptedly. Similarly, even when the macro cell and the small cell are the same radio system and the small cell is provided with only the communication function of the user plane, the macro cell can communicate the control plane data using the user plane and can thereby execute movement management uninterruptedly.

Thus, according to the present embodiment, as in the case of Embodiment 1, in the heterogeneous network in which the macro cell executes movement management using the control plane and the small cell handles the user plane, it is possible to continue data communication in the small cell while continuing movement management in the macro cell even when the terminal is located outside the service area of the macro cell. Furthermore, according to the present embodiment, even when direct communication between the terminal and the macro cell is not possible, it is possible for the macro cell to appropriately perform movement management compared to Embodiment 1.

The embodiments of the present invention have been described so far.

Note that although cases have been described with the above embodiments as examples where the present invention is configured by hardware, the present invention can also be realized by software in cooperation with hardware.

Each function block employed in the description of each of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration.

Further, the method of circuit integration is not limited to LSI's, and implementation using dedicated circuitry or general purpose processors is also possible. After LSI manufacture, utilization of a programmable FPGA (field programmable gate array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosure of Japanese Patent Application No. 2014-058089 filed on Mar. 20, 2014, the contents of which including the specification and drawings are incorporated herein by reference in its entirety.

INDUSTRIAL APPLICABILITY

The present invention is suitable for use in mobile communication systems.

REFERENCE SIGNS LIST

100 Terminal
200, 300 Base station
101, 110, 201, 301 Receiving section
102, 111, 202, 302 Transmitting section
103, 112 Receiving-quality measuring section
104, 205 First determining section
105, 204 Radio-resource control section
106, 206 Second determining section
107, 207 Keep-alive-packet transmitting/receiving section
108, 208 Application section
109, 113, 203, 303 Data processing section
150 First-communication processing section
151 Second-communication processing section
209, 304 Inter-base-station I/F control section

The invention claimed is:

1. A base station in a macro cell that performs communication using a control plane in a communication system in which the macro cell performs communication using the control plane and a small cell performs communication using a user plane with respect to a terminal, the base station comprising:
   first determination circuitry which, in operation, determines, when there is no response to data of the control plane transmitted to the terminal, that the terminal is located outside a service area of the base station;
   transmission and reception circuitry which, in operation, transmits, when the first determination circuitry determines that the terminal is located outside the service area of the base station, a confirmation packet that confirms connection between the terminal and the small cell as data of the user plane to the terminal via the small cell and receives a response to the confirmation packet as the data of the user plane from the terminal via the small cell;
   second determination circuitry which, in operation assumes, upon receiving the response, that the terminal is located inside the service area of the base station; and
   control circuitry which, in operation, causes, when the second determination circuitry assumes that the terminal is located inside the service area of the base station, the connection of the control plane between the terminal and the base station to continue.

2. The base station according to claim 1, wherein the transmission and reception circuitry, in operation, encapsulates the data of the control plane, transmits the encapsulated data of the control plane as the confirmation packet and receives the response to the data of the control plane, encapsulated in the terminal.

3. The base station according to claim 1, wherein a radio system of the macro cell is different from a radio system of the small cell.

4. The base station according to claim 1, wherein
   a radio system of the macro cell is identical to a radio system of the small cell, and
   the small cell is a base station capable of performing only communication using the user plane.

5. A terminal in a communication system in which a macro cell performs communication using a control plane and a small cell performs communication using a user plane with respect to the terminal, the terminal comprising:
   first determination circuitry which, in operation, determines, when a reception level of a signal transmitted from the macro cell is less than a predetermined threshold, that the terminal is located outside a service area of the macro cell;
   transmission and reception circuitry which, in operation, transmits, when the first determination circuitry determines that the terminal is located outside the service area of the macro cell, a confirmation packet that confirms connection between the terminal and the small cell as data of the user plane to the macro cell via the small cell and receives a response to the confirmation packet as the data of the user plane from the macro cell via the small cell;

second determination circuitry which, in operation, assumes, upon receiving the response, that the terminal is located inside the service area of the macro cell; and control circuitry which, in operation, causes, when the second determination circuitry assumes that the terminal is located inside the service area of the macro cell, the connection of the control plane between the terminal and the macro cell to continue.

6. A communication method in a base station in a macro cell that performs communication using a control plane in a communication system in which the macro cell performs communication using the control plane and a small cell performs communication using a user plane with respect to a terminal, the method comprising:

determining, when there is no response to data of the control plane transmitted to the terminal, that the terminal is located outside a service area of the base station;

transmitting, when the determining determines that the terminal is located outside the service area of the base station, a confirmation packet that confirms connection between the terminal and the small cell as data of the user plane to the terminal via the small cell and receiving a response to the confirmation packet as the data of the user plane from the terminal via the small cell;

assuming, upon receiving the response, that the terminal is located inside the service area of the base station; and causing, when the assuming assumes that the terminal is located inside the service area of the base station, the connection of the control plane between the terminal and the base station to continue.

7. A communication method in a terminal in a communication system in which a macro cell performs communication using a control plane and a small cell performs communication using a user plane with respect to the terminal, the method comprising:

determining, when a reception level of a signal transmitted from the macro cell is less than a predetermined threshold, that the terminal is located outside a service area of the macro cell;

transmitting, when the determining determines that the terminal is located outside the service area of the base station, a confirmation packet that confirms connection between the terminal and the small cell as data of the user plane to the terminal via the small cell and receiving a response to the confirmation packet as the data of the user plane from the terminal via the small cell;

assuming, upon receiving the response, that the terminal is located inside the service area of the macro cell; and causing, when the assuming assumes that the terminal is located inside the service area of the macro cell, the connection of the control plane between the terminal and the macro cell to continue.

* * * * *